US012523355B2

(12) United States Patent
Schweiner et al.

(10) Patent No.: US 12,523,355 B2
(45) Date of Patent: Jan. 13, 2026

(54) FOCUS ASSISTANCE FOR ROTATING LUMINAIRE BASED ON MEASUREMENTS BY INDEPENDENTLY ROTATING DISTANCE SENSOR

(71) Applicant: Electronic Theatre Controls, Inc., Middleton, WI (US)

(72) Inventors: Maxwell Schweiner, Middleton, WI (US); Evan Gnam, Madison, WI (US); Matthew Stoner, Middleton, WI (US); Noah Meltzer, Middleton, WI (US)

(73) Assignee: Electronic Theatre Controls, Inc., Middleton, WI (US)

( * ) Notice: Subject to any disclaimer, the term of this patent is extended or adjusted under 35 U.S.C. 154(b) by 413 days.

(21) Appl. No.: 18/193,903

(22) Filed: Mar. 31, 2023

(65) Prior Publication Data
US 2024/0328599 A1    Oct. 3, 2024

(51) Int. Cl.
*F21V 14/02* (2006.01)
*F21V 5/00* (2018.01)
(Continued)

(52) U.S. Cl.
CPC ............. *F21V 14/02* (2013.01); *F21V 5/008* (2013.01); *F21V 14/06* (2013.01);
(Continued)

(58) Field of Classification Search
CPC .......... F21V 14/02; F21V 5/008; F21V 14/06; F21V 23/0471; F21V 21/14; F21V 21/30;
(Continued)

(56) References Cited

U.S. PATENT DOCUMENTS 3,577,144 A    5/1971 Girault
4,580,251 A    4/1986 Koukovinis
(Continued)

FOREIGN PATENT DOCUMENTS

DE    102018133495 A1    7/2019
JP    H10301202 A    11/1998
(Continued)

OTHER PUBLICATIONS

Berkovic et al., "Optical methods for distance and displacement measurements," Advances in Optics and Photonics, 2012, 4: 441-471.
(Continued)

*Primary Examiner* — Michelle M Iacoletti
*Assistant Examiner* — Judy Dao Tran
(74) *Attorney, Agent, or Firm* — Michael Best & Friedrich LLP

(57) ABSTRACT

A lighting system capable of providing automated focus assistance for a rotatable lighting fixture thereof. In one example, an independently rotatable distance-measurement device located in the same theater-stage or light-show environment as the rotatable lighting fixture operates to measure a distance to the projection surface and transmits the measurement to an electronic controller. The electronic controller uses the measurement and a suitable algorithm to determine a focus parameter value for the projection optics of the rotatable lighting fixture. The determined focus parameter value is encoded in a control signal, which is then used to command a motor to move the corresponding component of the projection optics, thereby bringing and/or keeping in focus a pertinent edge of the illuminated area on the projection surface. An example method for automated focus assistance supports cue stack programming, single shot focus assistance, and continuous focus assistance.

20 Claims, 13 Drawing Sheets

(51) Int. Cl.
*F21V 14/06* (2006.01)
*F21V 23/04* (2006.01)
*G02B 7/28* (2021.01)
*H05B 47/19* (2020.01)
*F21W 131/406* (2006.01)

(52) U.S. Cl.
CPC ............ *F21V 23/0471* (2013.01); *G02B 7/28* (2013.01); *H05B 47/19* (2020.01); *F21W 2131/406* (2013.01)

(58) Field of Classification Search
CPC ....... F21V 23/0442; G02B 7/28; G02B 7/021; G02B 7/09; G02B 7/102; G02B 7/10; H05B 47/19; F21W 2131/406; F21W 2131/105; F21S 10/00; G01S 7/48; G01S 7/4802; G01S 7/4811; G01S 17/08
See application file for complete search history.

(56) References Cited

U.S. PATENT DOCUMENTS

| | | | | |
|---|---|---|---|---|
| 5,988,817 | A * | 11/1999 | Mizushima | G03B 37/04 353/30 |
| 8,994,925 | B2 | 3/2015 | Lewis | |
| 9,335,403 | B2 | 5/2016 | Lewis | |
| 10,111,295 | B1 | 10/2018 | Belliveau | |
| 10,274,175 | B1 | 4/2019 | Wood et al. | |
| 10,939,091 | B1 | 3/2021 | Choi et al. | |
| 2004/0051860 | A1 * | 3/2004 | Honda | G01S 17/87 356/4.01 |
| 2011/0181841 | A1 | 7/2011 | Sawahata | |
| 2014/0063261 | A1 | 3/2014 | Betensky et al. | |
| 2014/0184786 | A1 * | 7/2014 | Georgeson | G01M 99/00 348/128 |
| 2016/0212344 | A1 | 7/2016 | Takeuchi | |
| 2017/0230649 | A1 | 8/2017 | Galor Gluskin et al. | |
| 2018/0091784 | A1 | 3/2018 | Dutton et al. | |
| 2018/0297508 | A1 | 10/2018 | Fiege et al. | |
| 2019/0077306 | A1 | 3/2019 | Duncan et al. | |
| 2020/0034591 | A1 | 1/2020 | Bachelder et al. | |
| 2021/0279444 | A1 | 9/2021 | Lindner et al. | |
| 2022/0229183 | A1 | 7/2022 | Chang et al. | |
| 2022/0345632 | A1 * | 10/2022 | Zhuang | F21V 21/15 362/319 |
| 2022/0397740 | A1 * | 12/2022 | Sugimoto | G03B 13/36 359/823 |
| 2022/0400240 | A1 | 12/2022 | Fujikawa et al. | |
| 2024/0089596 | A1 | 3/2024 | Verma et al. | |
| 2024/0288659 | A1 | 8/2024 | Feng et al. | |
| 2024/0328599 | A1 | 10/2024 | Schweiner et al. | |

FOREIGN PATENT DOCUMENTS

| | | |
|---|---|---|
| JP | 2015069895 A | 4/2015 |
| WO | 2013142434 A2 | 9/2013 |

OTHER PUBLICATIONS

2 Qiu et al., "Review of Ultrasonic Ranging Methods and Their Current Challenges," Micromachines, 2022, 13: 520.
United Kingdom Intellectual Property Office Action for Application No. 2310362.5 dated Mar. 11, 2024 (4 pages).
United Kingdom Intellectual Property Office Action for Application No. 2310359.1 dated Mar. 20, 2024 (4 pages).
United States Patent Office Non-Final Rejection for U.S. Appl. No. 18/193,893 dated Jul. 24, 2025 (21 pages).
German Patent Office Action for Application No. 102023133377.1 dated Sep. 8, 2025 (14 pages including English machine translation).

* cited by examiner

FOCUS ASSISTANCE FOR ROTATING LUMINAIRE BASED ON MEASUREMENTS BY INDEPENDENTLY ROTATING DISTANCE SENSOR

FIELD

Various example embodiments relate generally to light sources and, more specifically but not exclusively, to automated control of certain functions of a moving lighting fixture.

BACKGROUND

A typical lighting fixture has at least one control feature to make the projected beam wider or narrower and, in some examples, sharper or softer edged. In some designs, a focus knob of the lighting fixture is configured to move the lamp and reflector relative to the lens(es), which is (are) fixedly attached to a stationary base. In some other designs, a focus knob of the lighting fixture is configured to move the lens(es) while the lamp remains stationary.

SUMMARY

Disclosed herein are, among other things, various examples, aspects, features, and embodiments of a lighting system capable of providing automated focus assistance for a rotatable lighting fixture thereof. In one example, an independently rotatable distance-measurement device located in the same theater-stage or light-show environment as the rotatable lighting fixture operates to measure a distance to the projection surface and transmits the measurement to an electronic controller. The electronic controller uses the measurement and a suitable algorithm to determine a focus parameter value for the projection optics of the rotatable lighting fixture. The determined focus parameter value is encoded in a control signal, which is then used to command a motor to move the corresponding component (e.g., a lens or a group of lenses) of the projection optics, thereby bringing and/or keeping in focus a pertinent edge of the illuminated area on the projection surface. An example method for automated focus assistance supports cue stack programming, single shot focus assistance, and continuous focus assistance. Advantageously, at least some embodiments involve a better manageable programming load on the operator of the lighting system and/or do not substantially rely on human intervention for focus assistance.

One example provides an apparatus comprising: an optical assembly to project a light beam generated with a first light source onto a projection surface, the optical assembly being movable with respect to the projection surface and including a first lens, a second lens, and a third lens arranged along an optical axis of the optical assembly, the second lens and the third lens being independently translatable with respect to the first lens to different positions along the optical axis; a distance-measurement device configured to provide a measure of a distance between the optical assembly and the projection surface, the distance-measurement device being movable together with the optical assembly; and a control circuit configured to determine an estimated position of the third lens with which an edge of an area illuminated by the light beam on the projection surface is in focus, the estimated position being determined based on the measure and further based on an axial position of the second lens.

Another example provides a method of providing focus assistance for a lighting fixture, the method comprising: obtaining, with an electronic processor, a first parameter value representing an axial position of a second lens in an optical assembly including a first lens, the second lens, and a third lens arranged along an optical axis of the optical assembly, the second lens and the third lens being independently translatable with respect to the first lens to different positions along the optical axis; obtaining, with the electronic processor, a measure of a distance between the lighting fixture and a projection surface; and determining, with the electronic processor, a second parameter value representing an estimated position of the third lens with which an edge of an area illuminated by the lighting fixture on the projection surface is in focus, the second parameter value being determined based on the measure and further based on the first parameter value.

Yet another example provides a non-transitory computer-readable medium storing instructions that, when executed by at least one processor, cause the at least one processor to perform operations comprising the above method of providing focus assistance for a lighting fixture.

Yet another example provides a lighting system, comprising: a first lighting fixture including a first optical assembly configured to project a first light beam onto a projection surface, the first optical assembly being rotatable with respect to the projection surface and including a first lens, a second lens, and a third lens arranged along an optical axis of the first optical assembly, the second lens and the third lens being independently translatable with respect to the first lens to different positions along the optical axis of the first optical assembly; a first distance measurement device mounted on a first pan-and-tilt apparatus and configured to provide a measure of a distance between the first distance measurement device and the projection surface, the first distance-measurement device being rotatable with respect to the projection surface by operation of the first pan-and-tilt apparatus, the first distance-measurement device and the first optical assembly being rotatable independent of one another; and a control circuit configured to determine an estimated position of the third lens with which an edge of an area illuminated by the first light beam on the projection surface is in focus, the estimated position being determined based on the measure and further based on an axial position of the second lens in the first optical assembly.

Yet another example provides a method of providing focus assistance for a rotatable lighting fixture, the method comprising: receiving, with an electronic controller, a first distance measurement from a first rotatable distance-measurement device; obtaining, with the electronic controller, first values representing pan and tilt angles of the first rotatable distance-measurement device and second values representing pan and tilt angles of the rotatable lighting fixture; computing, with the electronic controller, an estimated throw value for the rotatable lighting fixture based on the first distance measurement, the first values, and the second values; and transmitting, with the electronic controller, the estimated throw value to an electronic processor.

Yet another example provides a non-transitory computer-readable medium storing instructions that, when executed by at least one processor, cause the at least one processor to perform operations comprising the above method of providing focus assistance for a rotatable lighting fixture.

Other aspects of the disclosure will become readily apparent by consideration of the detailed description and accompanying drawings.

DETAILED DESCRIPTION

Some stage lighting fixtures can be dynamically adjusted to redirect the light beam around the stage in accordance with the creative intent. In some examples, horizontal movements (panning) and vertical movements (tilting) of the light beam are enabled. In some additional examples, the lighting fixture itself can also be translated with respect to the projection surface (e.g., a lighted part of the theater stage or light-show environment). Movable lighting fixtures may come in a variety of different flavors and designs, including the spot, wash, beam, and hybrid varieties. Some movable lighting fixtures also have color-changing capabilities, gobo patterns, barndoors, shutters, and/or other features and functions.

Figure 1:
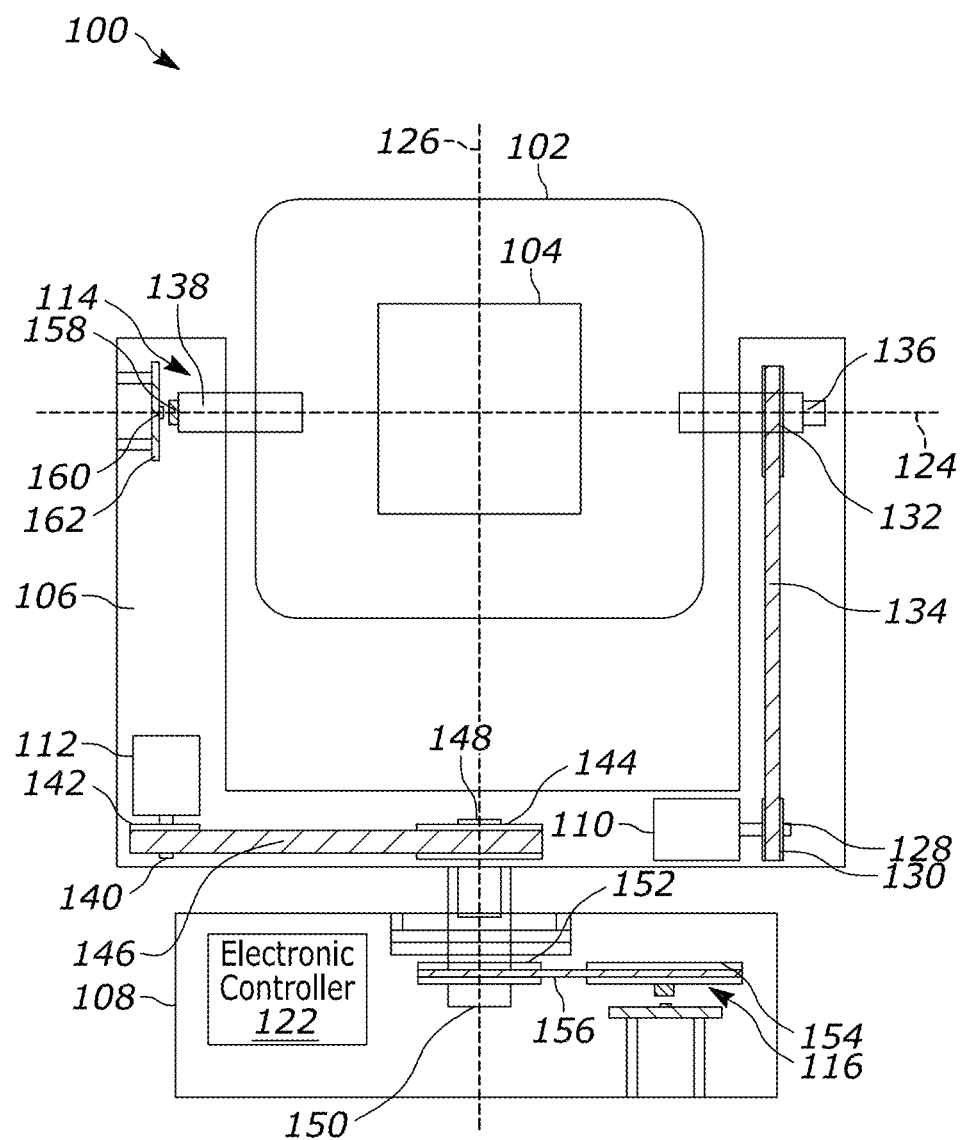
FIG. 1 is a diagram illustrating a lighting fixture using which at least some embodiments are practiced.

FIG. 1 is a diagram illustrating a lighting fixture 100 with which at least some embodiments may be practiced. The lighting fixture 100 is a movable lighting fixture that includes, among other things, a housing 102, one or more light sources 104, a frame 106, a base 108, a first stepper motor 110, a second stepper motor 112, a first magnetic position encoder 114, a second magnetic position encoder 116, and an electronic controller 122. In various examples, the one or more light sources 104 include one or more light sources one or more incandescent or light-emitting diode (LED) light sources appropriately positioned within the housing 102. The first stepper motor 110 is operably coupled to the housing 102 such that the first stepper motor 110 rotates the housing 102 about a first axis of rotation 124. The second stepper motor 112 is operably coupled to the housing 102 such that the second stepper motor 112 rotates the housing 102 about a second axis of rotation 126. In some embodiments, the second axis of rotation 126 is orthogonal to the first axis of rotation 124.

In the example embodiment illustrated in FIG. 1, the first stepper motor 110 is configured to apply torque to a first output shaft 128. A first pulley 130 is mounted on the first output shaft 128 for rotation together therewith. The first pulley 130 is coupled to a second pulley 132 via a first belt 134 to transfer torque therebetween. The second pulley 132 is mounted to a first shaft 136 for rotation together therewith. The first shaft 136 is fixedly coupled to the housing 102 such that the housing 102 and the first shaft 136 rotate together about the first axis of rotation 124. The housing 102 is also fixedly coupled to a second shaft 138 such that the second shaft 138, the housing 102, and the first shaft 136 all rotate together about the first axis of rotation 124.

In the example embodiment illustrated in FIG. 1, the second stepper motor 112 is configured to apply torque to a second output shaft 140. A third pulley 142 is mounted on the second output shaft 140 for rotation together therewith. The third pulley 142 is coupled to a fourth pulley 144 via a second belt 146 to transfer torque therebetween. The fourth pulley 144 is fixedly coupled to a third shaft 148. The third shaft 148 is fixedly coupled to the base 108. In operation, the second stepper motor 112 applies torque to the fourth pulley 144 (via the second output shaft 140, the third pulley 142, and the second belt 146), which causes the frame 106 to rotate about the second axis of rotation 126. The housing 102 is coupled to the frame 106 via the first shaft 136 and the second shaft 138 such that the housing 102 rotates with the frame 106 about the second axis of rotation 126. A fourth shaft 150 is fixedly coupled to the frame 106 such that the fourth shaft 150, the frame 106, and the housing 102 all rotate together about the second axis of rotation 126. The fourth shaft 150 partially extends into the base 108 along the second axis of rotation 126. A fifth pulley 152 is fixedly mounted to the fourth shaft 150 such that the fifth pulley 152, the fourth shaft 150, the frame 106, and the housing 102 all rotate together about the second axis of rotation 126. The fifth pulley 152 is coupled to a sixth pulley 154 via a third belt 156 to transfer torque therebetween.

The first magnetic position encoder 114 is configured to measure the angular position of the housing 102 about the first axis of rotation 124. The first magnetic position encoder 114 includes, among other things, a first magnet 158 and a first magnetic position sensor 160. In the example embodiment illustrated in FIG. 1, the first magnet 158 is fixedly mounted to an end of the second shaft 138 such that the first magnet 158, the second shaft 138, the housing 102, and the first shaft 136 all rotate together about the first axis of rotation 124. The first magnetic position sensor 160 is fixedly mounted to the frame 106 via a first circuit board 162. In some embodiments, the first magnet 158 is fixedly mounted to an end of the first shaft 136 such that the first magnet 158, the first shaft 136, and the housing 102 all rotate together about the first axis of rotation 124. Alternatively, in some embodiments, the first magnetic position sensor 160 is fixedly mounted to an end of the first shaft 136 or the second shaft 138 such that the first magnetic position sensor 160, the first shaft 136, the second shaft 138, and the housing 102 all rotate together about the first axis of rotation 124. In such embodiments, the first magnet 158 is fixedly mounted to the frame 106, for example, via the first circuit board 162.

When the base 108 is oriented such that the second axis of rotation 126 is vertical (i.e., substantially parallel to the gravity vector), rotation of the frame 106 about the second axis of rotation 126 produces a panning motion of the light beam emitted by the lighting fixture 100. In the same orientation of the base 108, rotation of the housing 102 about the first axis of rotation 124 produces a tilting motion of the light beam emitted by the lighting fixture 100. In some embodiments, the base 108 is fixedly attached to a movable rig capable of providing one, two, or three degrees of freedom for translating the lighting fixture 100, as a whole, with respect to a stationary projection surface onto which the emitted light beam is projected.

The electronic controller 122 includes a plurality of electrical and electronic components that provide power, operational control, and protection to the components, blocks, and modules within the lighting fixture 100. An example computing device that can be used to implement the electronic controller 122 in at least some embodiments is described in more detail below in reference to FIG. 7. In operation, the electronic controller 122 controls the orientation of the housing 102 with respect to the base 108 via the first stepper motor 110 and the second stepper motor 112. The electronic controller 122 is operably coupled to the first stepper motor 110 and to the second stepper motor 112 to provide one or more control signals thereto. In various configurations, the electronic controller 122 generates said one or more control signals by executing a program code or in response to executable instructions received from an external electronic controller. Some embodiments of the lighting fixture 100 and/or of the electronic controller 122 may benefit from at least some features disclosed in U.S. Pat. No. 10,274,175, which is incorporated herein by reference in its entirety.

Figure 2:
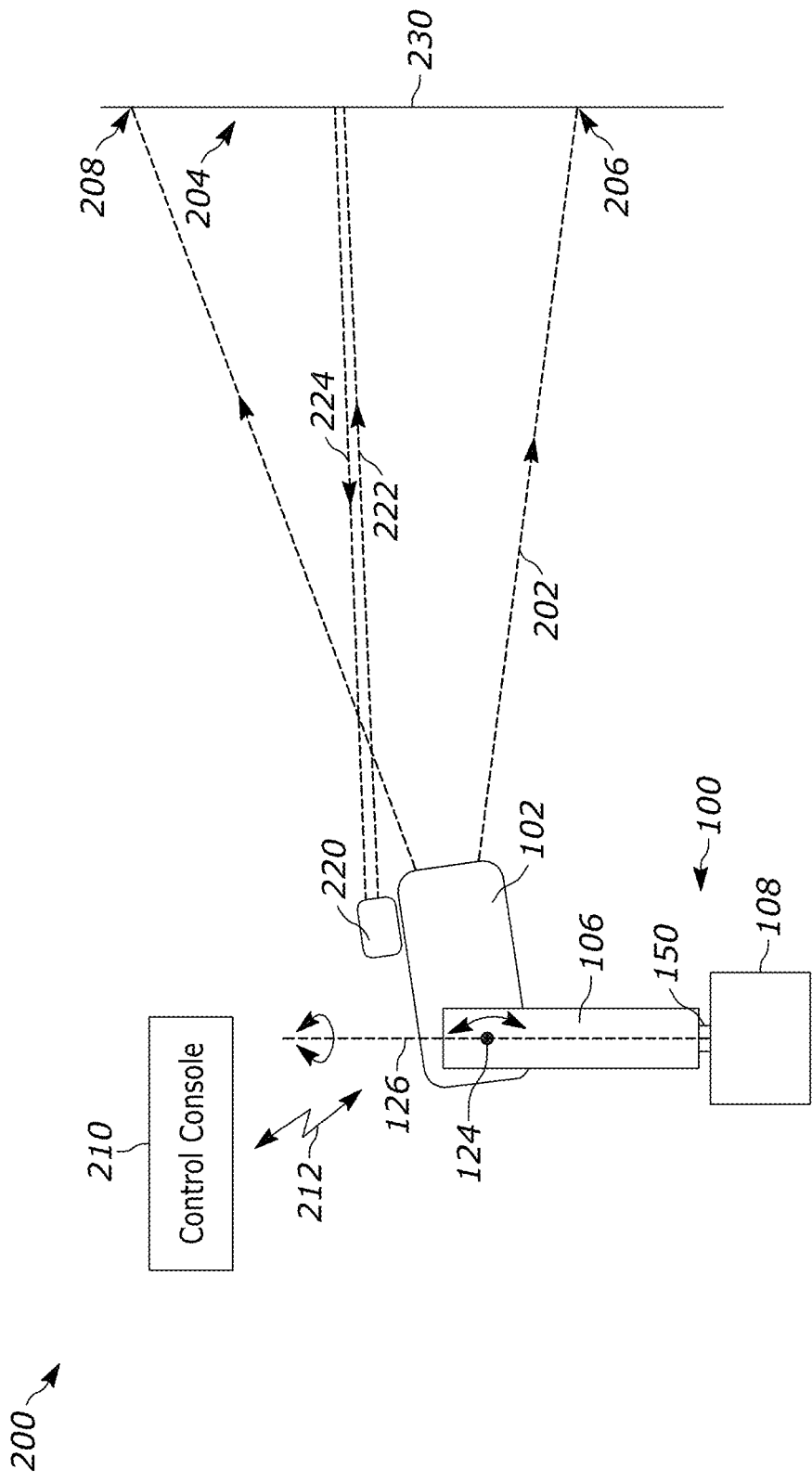
FIG. 2 is a block diagram illustrating a lighting system including the lighting fixture of FIG. 1 according to some embodiments.

FIG. 2 is a block diagram illustrating a lighting system 200 according to an embodiment. The lighting system 200 includes the lighting fixture 100 described above in reference to FIG. 1. Note that FIG. 2 illustrates a side view of the lighting 100, whereas FIG. 1 illustrates a front view. Directional difference between the shown side and front views is approximately 90 degrees. In the view illustrated in FIG. 2, the first axis of rotation 124 is orthogonal to the plane of the block diagram, and the second axis of rotation 126 is parallel to the plane of the block diagram.

In operation, the lighting fixture 100 projects a light beam 202 onto a projection surface 230. Rotation of the housing 102 about the first axis of rotation 124 causes a tilting motion of the light beam 202 and a corresponding vertical movement of an illuminated area 204 along the projection surface 230. Rotation of the frame 106 about the second axis of rotation 126 causes a panning motion of the light beam 202 and a corresponding horizontal movement of the illuminated area 204 along the projection surface 230. Lower and upper edges of the illuminated area 204 are labeled in FIG. 2 using the reference numerals 206 and 208, respectively. In different examples, the periphery of the illuminated area 204 has different geometric shapes. In a representative example, the periphery of the illuminated area 204 may have a circular, elliptical, or irregular shape. In some examples, the illuminated area 204 has internal edges in addition to the peripheral edges 206, 208. The shape of the internal edges of the illuminated area 204 is typically determined by the shape of a gobo used with the projection optics of the lighting fixture 100.

In some use cases, the creative intent calls for the peripheral and/or internal edges of the illuminated area 204 to be relatively sharp, e.g., to have a short distance over which the light intensity transitions between a high (e.g., full) light intensity and a low (e.g., substantially zero) light intensity. The sharpness of the edges can typically be changed via appropriate adjustment of the configuration of the projection optics of the lighting fixture 100. Herein, an internal or peripheral edge of the illuminated area 204 is referred to as being "in focus" when that edge has approximately the shortest full-to-dark transition distance obtainable by adjusting the projection optics of the lighting fixture 100. An internal or peripheral edge of the illuminated area 204 is referred to as being "out of focus" when its full-to-dark transition distance is significantly larger (e.g., by a factor of three or more) than the shortest obtainable full-to-dark transition distance.

In typical theater-stage and light-show environments, the projection surface 230 has a nonplanar, multiplanar, curved, and/or relatively complex topology. In such environments, when the light beam 202 is tilted and/or panned, e.g., as described above, various edges of the illuminated area 204 may go out focus, and appropriate adjustments to the projection optics of the lighting fixture 100 are needed to bring those edges back in focus. When movements of the light beam 202 are relatively dynamic (e.g., are frequent and/or have a relatively high angular speed), such adjustments to the projection optics of the lighting fixture 100 need to be made dynamically as well. However, some conventional approaches to making such adjustments involve relatively extensive human intervention and/or relatively high programming load. For example, some programming solutions rely on the previously acquired, detailed and accurate depth maps of the corresponding theater-stage or light-show environment, which can be rather time consuming to generate.

The above-indicated and possibly some other related problems in the state of the art can beneficially be addressed using at least some embodiments disclosed herein. According to an example embodiment, a distance-measurement device 220 attached to the housing 102 of the lighting fixture 100 operates to measure a distance (throw) to the projection surface 230 and transmits a corresponding stream of measurements to a responsible control entity. In one embodiment, the responsible control entity is implemented using at least some control circuitry of the lighting fixture 100 and the control console 210. The responsible control entity uses the measurements to determine focus parameter values for the projection optics of the lighting fixture 100. The determined focus parameter values are encoded in corresponding control signals, which are sent to the appropriate control card(s) of the motors configured to move appropriate elements of the projection optics. The control card(s) then operate the motors in accordance with the received control signals, thereby bringing and/or keeping in focus the pertinent edge(s) of the illuminated area 204. Advantageously, at least some embodiments involve a manageable programming load on the operator of the lighting system 200 and/or do not substantially rely on human intervention for focus assistance.

In an example embodiment, the distance-measurement device 220 is configured to accurately measure the distance to the projection surface 230 when the distance is in the range between approximately 1 m and approximately 300 m. In some examples, the distance-measurement device 220 is or comprises an optical distance-measurement device. In some other examples, the distance-measurement device 220 is or comprises another (i.e., non-optical) type of a distance-measurement device. Example non-optical distance-measurement devices that can be used to implement the distance-measurement device 220 are described in more detail below. For illustration purposes and without any implied limitations, the lighting system 200 is described in reference to an embodiment in which the distance-measurement device 220 is an optical distance-measurement device. From the provided description, a person of ordinary skill in the pertinent art will be able to make and use, without any undue experimentation, other embodiments of the lighting system 200 in which the distance-measurement device 220 is a non-optical distance-measurement device.

In some examples, the distance-measurement device 220 operates using acoustic or ultrasonic pulses or waveforms and is configured to accurately measure the distance to the projection surface 230 when the distance is in the range between approximately 0.5 m and approximately 15 m. In such examples, the measurement device 220 is designed to perform distance measurements using a suitable acoustic or ultrasonic distance-measurement method. In various examples, the acoustic or ultrasonic distance-measurement methods embodied in the operations of the ultrasonic distance-measurement device 220 are selected from (i) pulsed time of flight (TOF), (ii) a multi frequency continuous wave (MFCW) method, (iii) a binary frequency shift keying (BFSK) method, and (iv) an amplitude modulation (AM) method. The physical principles and signal-processing considerations for these and other acoustic or ultrasonic distance-measurement methods are reviewed, e.g., in Qiu Z. Lu Y, Qiu Z., "Review of Ultrasonic Ranging Methods and Their Current Challenges," Micromachines (Basel), 2022 Mar. 26; vol. 13, No. 4, p. 520, which is incorporated herein by reference in its entirety. Some embodiments of the acoustic or ultrasonic distance-measurement device 220 may benefit from at least some features disclosed, e.g., in U.S. Pat. Nos. 3,577,144 and 4,580,251, both of which are incorporated herein by reference in their entirety.

In different examples, the optical distance-measurement device 220 is designed to perform distance measurements using different suitable optical distance-measurement methods. In some examples, the optical distance-measurement methods embodied in the operations of the optical distance-measurement device 220 are selected from (i) triangulation, (ii) pulsed TOF, (iii) amplitude-modulated TOF, (iv) frequency-modulated continuous-wave TOF, and (v) laser interferometry. The physical principles of these and other optical distance-measurement methods are reviewed, e.g., in Garry Berkovic and Ehud Shafir, "Optical Methods for Distance and Displacement Measurements," Advances in Optics and Photonics, 2012, v. 4, pp. 441-471, which is incorporated herein by reference in its entirety. In some examples, the optical distance-measurement device 220 is a lidar ranging sensor configured to perform distance measurements using visible or infrared light. Some embodiments of the optical distance-measurement device 220 can benefit from at least some features disclosed, e.g., in U.S. Pat. Nos. 8,994,925 and 9,335,403, both of which are incorporated herein by reference in their entirety.

In various examples, the optical distance-measurement device 220 operates to send an optical probe beam 222 toward the projection surface 230. The transverse size of the optical probe beam 222 is typically smaller than the size of the illuminated area 204. The relative optical alignment of the optical distance-measurement device 220 and the projection optics of the lighting fixture 100 is such that the optical probe beam 222 hits a selected part of the illuminated area 204. For example, in some relative optical alignments, the optical probe beam 222 is aligned to hit the illuminated area 204 near a peripheral edge thereof, such as the edge 204 or 206. In some other relative optical alignments, the optical probe beam 222 is aligned to hit the illuminated area 204 in a middle portion thereof, e.g., near an internal gobo-generated edge. The probe beam 222 is reflected from the projection surface 230 in the illuminated area 204 thereof, and a portion 224 of the reflected optical beam is detected by an optical detector used in the optical distance measurement device 220 (also see FIG. 3). The electrical signal generated by the optical detector is processed, e.g., as described in more detail below, to determine the distance to the projection surface 230 or some suitable measure thereof. The measurement result is then communicated to the responsible control entity mentioned above.

The control console 210 is a multifunctional electronic controller configured to control various functions and features of the lighting fixture 100 using one or more DMX channels 212. Typically, the control console 210 is also connected, via other DMX channels, to several additional lighting fixtures deployed in the same theater-stage or light-show environment as the lighting fixture 100 (e.g., see FIG. 13). Some of such additional lighting fixtures can be similar to the lighting fixture 100 whereas some others can be of a fixed type. Representative controllable functions/features of the lighting fixtures to which the control console 210 is connected include, but are not limited to, panning, tilting, and translation movements; color(s) of the emitted light; intensity of the emitted light; optical zoom; optical focus; optical plane; gobo usage; iris changes; framing shutters; optical prism usage; and relative and absolute timing of various control operations directed to these functions/features. In a typical example, the control console 210 is placed in the control room, booth, or cabinet and remains stationary therein for the duration of the performance or light show. In contrast, the position and/or orientation of the lighting fixture 100 with respect to the control room, booth, or cabinet may change during the performance or light show in accordance with the creative intent. In some examples, the projection surface 230 is stationary. In some other examples, the projection surface 230 moves, changes its shape, or is otherwise reconfigured during the performance or light show, e.g., in accordance with the creative intent.

Figure 3:
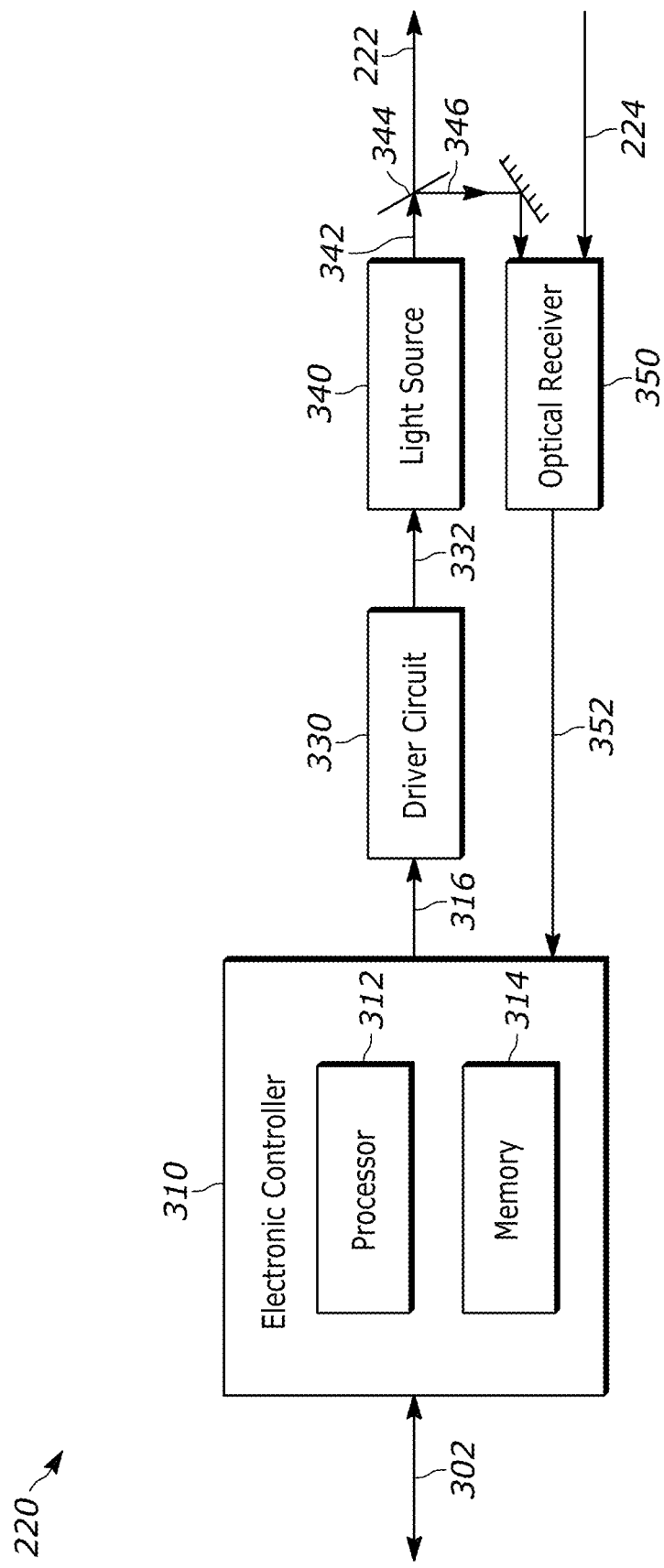
FIG. 3 is a block diagram illustrating an optical distance-measurement device used in the lighting system of FIG. 2 according to some embodiments.

FIG. 3 is a block diagram illustrating the optical distance-measurement device 220 according to some embodiments. In the example shown, the optical distance-measurement device 220 includes an electronic controller 310, a driver circuit 330, a light source (e.g., a laser) 340, and an optical receiver 350. The electronic controller 310 includes a processor 312 and a memory 314.

In operation, the electronic controller 310 provides instructions 316 to the driver circuit 330 based on which one or more drive signals (currents and/or voltages) 332 are generated thereby for the light source 340. The drive signals 332 drive the light source 340 to generate an optical output signal 342, with at least a portion thereof being transmitted out as the optical probe beam 222. In some examples, the drive signals 332 cause the optical output beam 342 to carry one or more optical pulses, an amplitude-modulated optical waveform, or a frequency-modulated optical waveform. In some examples, an optical beam splitter 344 is placed at the optical output port of the light source 340 to optically split the optical output beam 342 into two portions, with a first portion serving as the optical probe beam 222 and a second portion 346 serving as an optical reference signal for the optical receiver 350. In some examples, the optical reference signal 346 carries less than 10% of the optical power of the optical output beam 342. In some examples, the optical beam splitter 344 is absent.

The optical receiver 350 operates to generate an electrical signal 352 in response to the optical beam 224 received from the projection surface 230 as described above. In some examples, prior to undergoing optical-to-electrical (O/E)

conversion in the optical receiver 350, the reflected optical beam 224 is optically mixed with the optical reference signal 346. Such optical mixing is typically used in coherent detection schemes in which TOF parameters can be extracted from the relative phase and/or frequency of the optical beams 222 and 224. For example, when the optical probe beam 222 is linearly chirped, an optical signal produced by the optical mixing of the optical signals 224 and 346 contains a beat frequency that is proportional to the light's roundtrip time between the optical distance-measurement device 220 and the projection surface 230.

In some examples, the electrical signal 352 undergoes analog-to-digital conversion. The resulting digital form of the electrical signal 352 is processed by the processor 312 running a program code stored in the memory 314, with the program code causing the processor 312 to compute the distance between the optical distance-measurement device 220 and the projection surface 230 or a suitable measure thereof. The computed distance or measure is then transmitted from the electronic controller 310, via a communication channel 302, to the responsible control entity.

Figure 4:
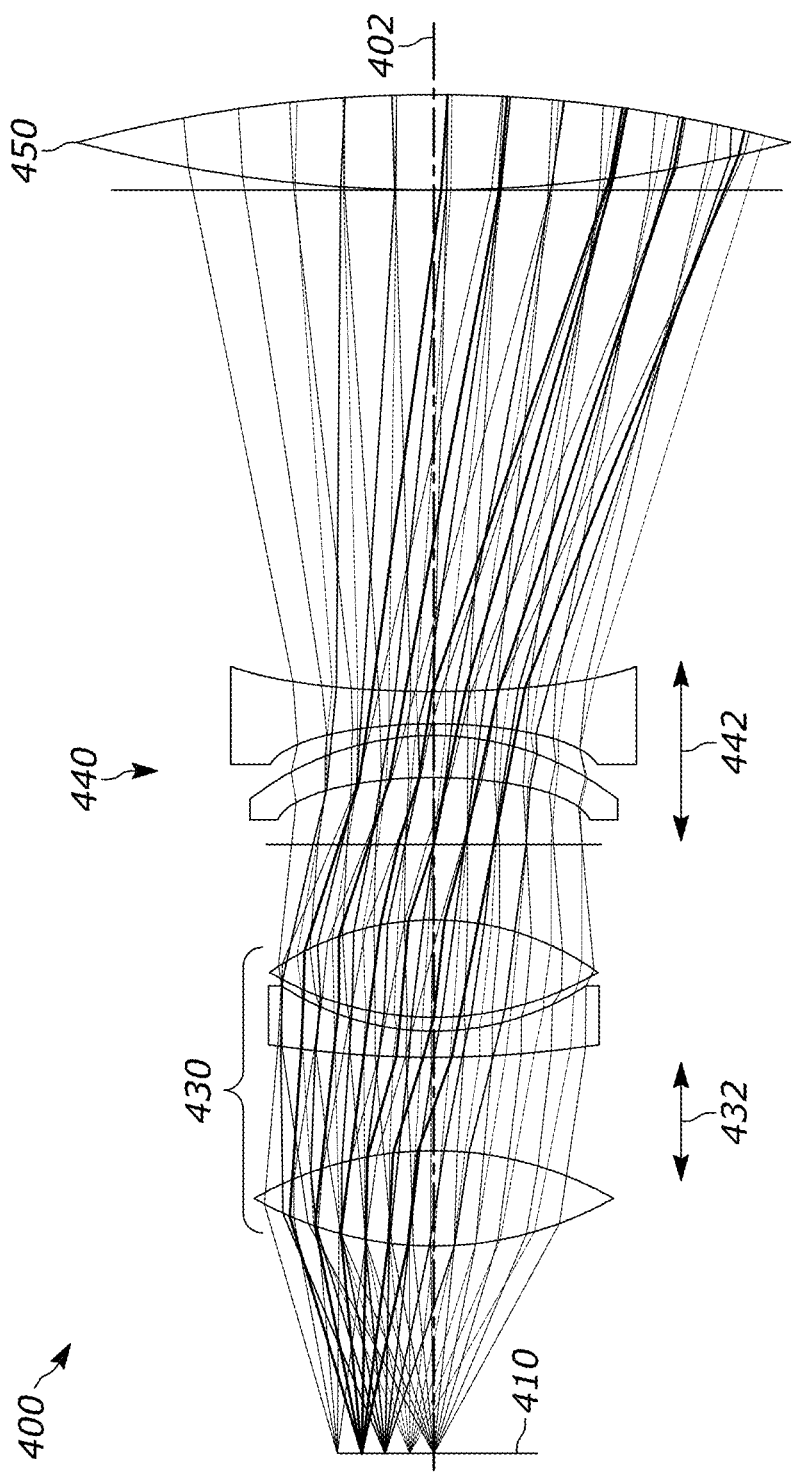
FIG. 4 is a block diagram illustrating an optical assembly used in the lighting fixture of FIG. 1 according to some embodiments.

FIG. 4 is a block diagram illustrating an optical assembly 400 used in the lighting fixture 100 according to some embodiments. In some examples, the optical assembly 400 is mounted in the housing 102 and includes an LED light source 410. The light emitted by the LED light source 410 is shaped in the optical assembly 400 as illustrated by the ray-tracing diagram shown in FIG. 4 and is transmitted out through an output lens 450 to form the light beam 202. Optical elements located between the LED light source 410 and the output lens 450 include a focus lens group 430 and a zoom lens group 440. The LED light source 410 and the output lens 450 have respective fixed positions in the housing 102. The focus lens group 430 and the zoom lens group 440 are movable with respect to the housing 102 as indicated by the double-headed arrows 432 and 442, respectively. In an example embodiment, the motion indicated by the double-headed arrows 432 and 442 is translation along an optical axis 402 of the optical assembly 400. In some embodiments, the optical assembly 400 may include additional optical elements (not explicitly shown in FIG. 4). In additional embodiments of the optical assembly 400, other suitable arrangements of various optical elements can also be used.

Figure 5:
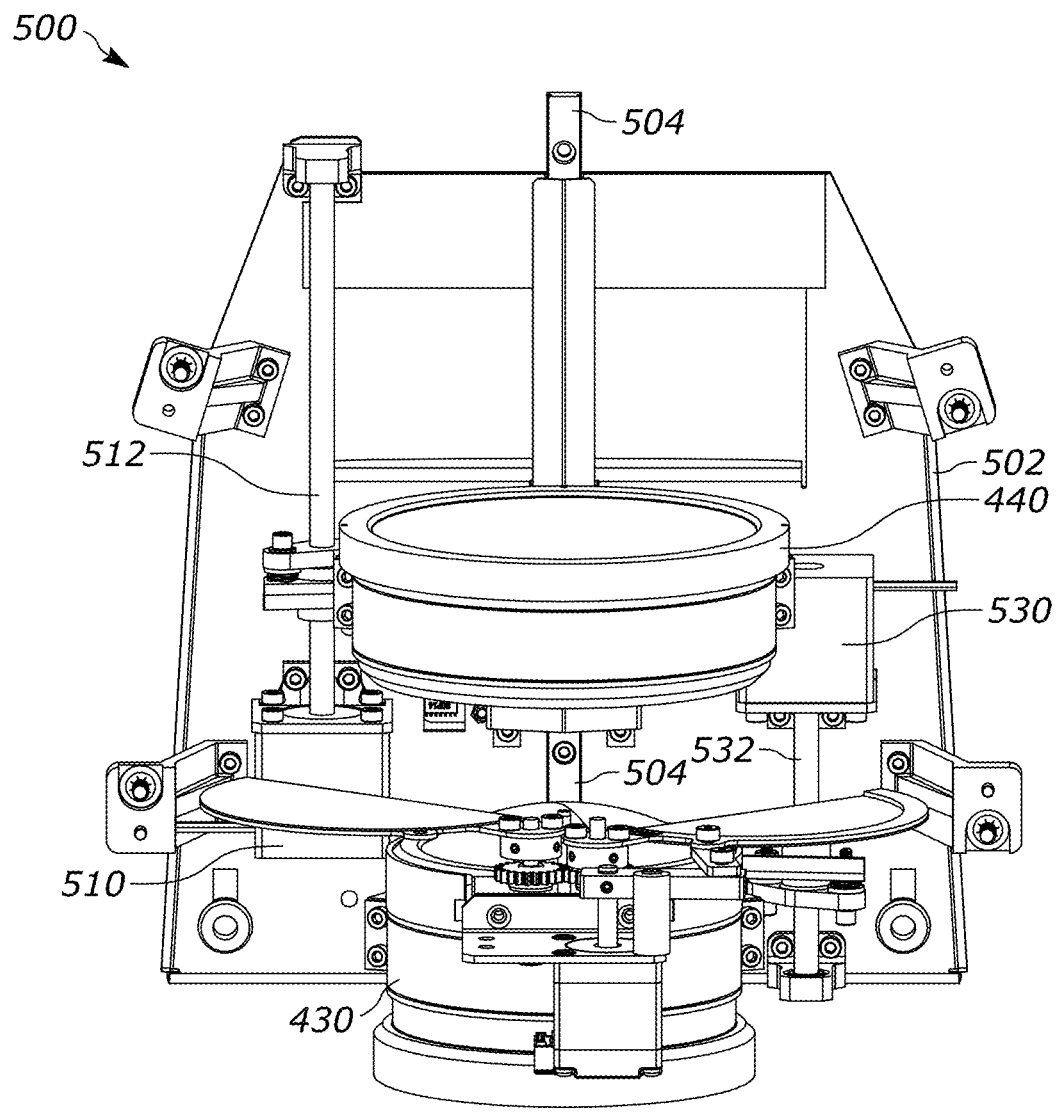
FIG. 5 is a perspective schematic view illustrating an opto-mechanical assembly used in the lighting fixture of FIG. 1 according to some embodiments.

FIG. 5 is a perspective schematic top view illustrating an opto-mechanical assembly 500 used in the lighting fixture 100 according to some embodiments. The opto-mechanical assembly 500 enables controllable independent translations of the focus lens group 430 and the zoom lens group 440 along the optical axis of the optical assembly 400. The translations occur along an optical rail 504 mounted on a base plate 502 of the assembly 500 and oriented to be parallel to the optical axis 402 of the optical assembly 400 (also see FIG. 4).

The opto-mechanical assembly 500 includes a first motor 510 attached to the base plate 502, which is a part of the housing 102. An actuator rod 512 of the motor 510 is mechanically coupled to a conventional optical carriage (not directly visible in the view of FIG. 5) mounted on the optical rail 504. In operation, rotation of the actuator rod 512 by the motor 510 produces translation of the optical carriage along the optical rail 504. Direction of the translation is determined by the rotation direction of the actuator rod 512. In some examples, clockwise rotation of the actuator rod 512 results in forward translation of the optical carriage along the optical rail 504, whereas counterclockwise rotation of the rod 512 results in backward translation of the optical carriage along the optical rail 504. The zoom lens group 440 is mounted on the optical carriage and, as such, is translated when the optical carriage is translated along the optical rail 504.

The opto-mechanical assembly 500 further includes a second motor 530 attached to the base plate 502. An actuator rod 532 of the motor 530 is mechanically coupled to a conventional second optical carriage (also not directly visible in the shown view) slidably mounted on the optical rail 504. The focus lens group 430 is mounted on the second optical carriage such that rotation of the actuator rod 532 by the motor 530 produces translation of the focus lens group 430 along the optical rail 504, with the direction of the translation being determined by the rotation direction (clockwise or counterclockwise) of the rod 532.

Figure 6:
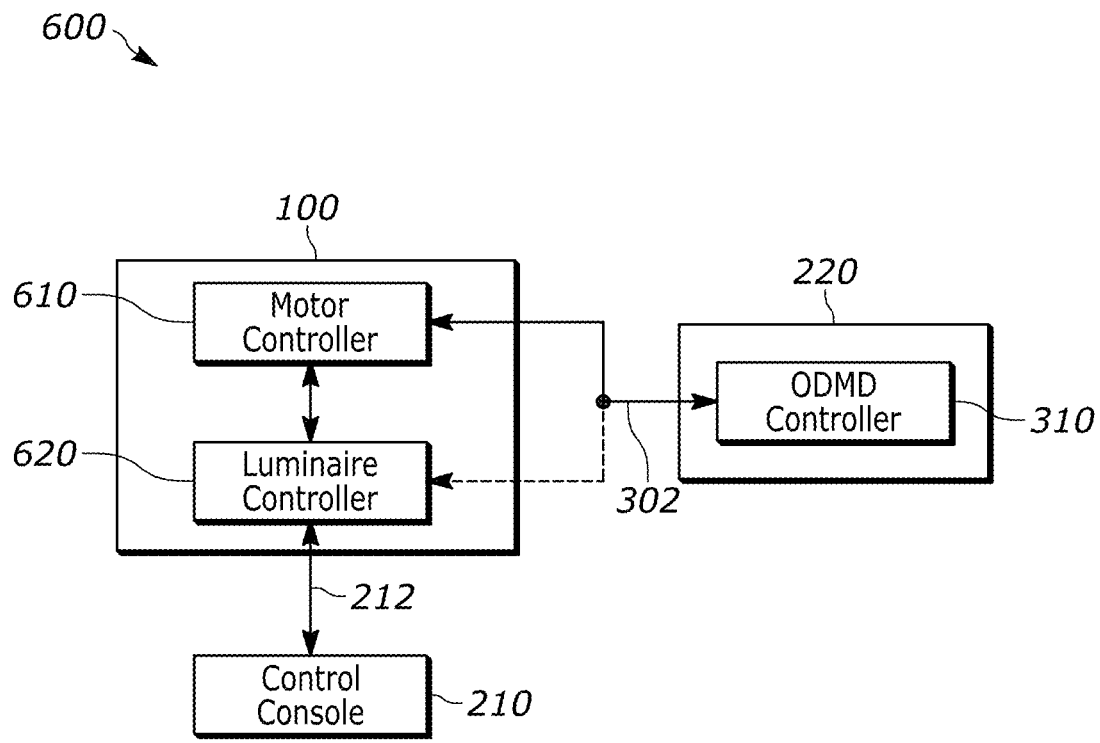
FIG. 6 is a block diagram illustrating a control circuit used in the lighting system of FIG. 2 according to some embodiments.

FIG. 6 is a block diagram illustrating a control circuit 600 used in the lighting system 200 according to some embodiments. The control circuit 600 includes the control console 210 of the lighting system 200 (also see FIG. 2) and the electronic controller 310 of the optical distance-measurement device (ODMD) 220 (also see FIG. 3). The control circuit 600 further includes a motor controller 610 and a luminaire controller 620, both located in the lighting fixture 100. In some embodiments, the motor controller 610 and the luminaire controller 620 are both located in the housing 102. In an example embodiment, the motor controller 610 operates to control two motors coupled to the corresponding translation stages for independently moving the focus lens group 430 and the zoom lens group 440 along the optical axis 402, e.g., as explained above in reference to FIG. 5. The luminaire controller 620 is communicatively connected to the control console 210 via the DMX channels 212. The motor controller 610 is communicatively connected to the luminaire controller 620 and can communicate therethrough with the control console 210. In some examples, the electronic controller 310 is directly communicatively connected to the motor controller 610 via the communication channel 302. In some other examples, the electronic controller 310 is instead directly communicatively connected to the luminaire controller 620, as indicated in FIG. 6 by the corresponding dashed line. In either case, the electronic controller 310 can communicate with the control console 220 through the corresponding path in the control circuit 600.

In different embodiments, various control operations associated with the methods disclosed herein below are diversely allocated to different constituent portions of the control circuit 600. For example, in one embodiment, the optical model computations directed at determining the translation amount for the motor 510 are performed by the motor controller 610 using appropriate inputs from the ODMD controller 310 and the control console 210. In some other embodiments, such optical model computations are performed by the luminaire controller 620 and/or the control console 210. Herein below, any selected portion of the control circuit 600 and well as the entirety of the control circuit 600 may be referred to as "control circuit."

Figure 7:
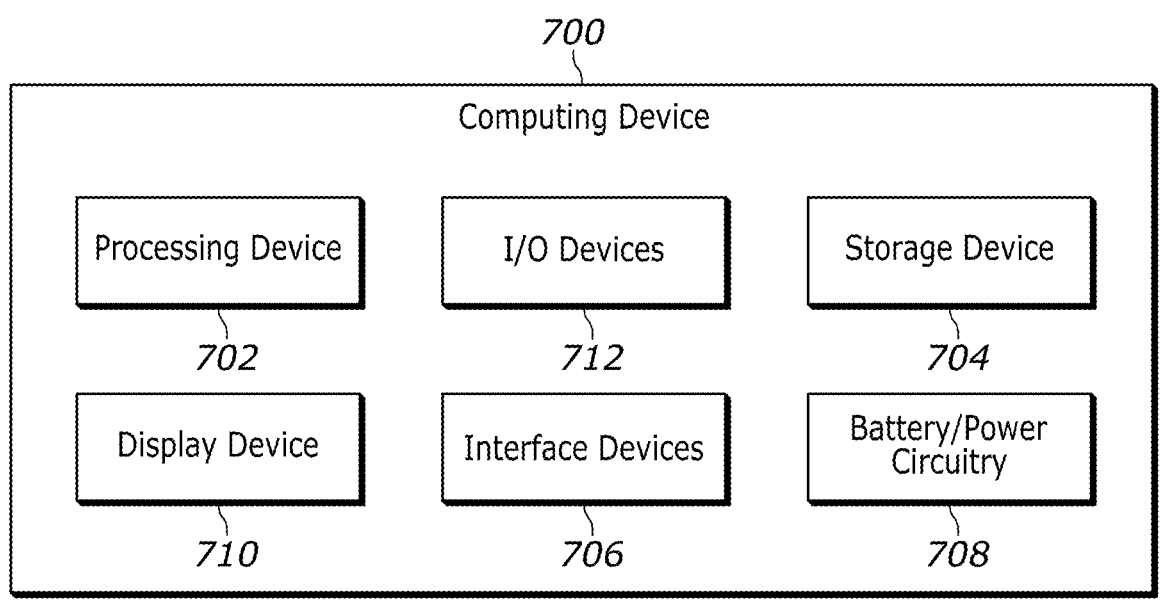
FIG. 7 is a block diagram of an example computing device used in the lighting system of FIG. 2 according to some embodiments.

FIG. 7 is a block diagram of an example computing device 700 configured to perform at least some control operations in the lighting system 200 according to some embodiments. For example, in some embodiments, the computing device 700 performs at least some control operations associated with the control methods described below (e.g., see FIG. 12). In some embodiments, the control circuit 600 is implemented using one or more instances (or nominal copies) of the computing devices 700.

The computing device 700 of FIG. 7 is illustrated as having a number of components, but any one or more of these components may be omitted or duplicated, as suitable for the application and setting. In some embodiments, some or all of the components included in the computing device 700 may be attached to one or more motherboards and enclosed in a housing. In some embodiments, some of those components may be fabricated onto a single system-on-a-chip (SoC) (e.g., the SoC may include one or more processors or processing devices 702 and one or more memories or storage devices 704). Additionally, in various embodiments, the computing device 700 may not include one or more of the components illustrated in FIG. 7, but may include interface circuitry for coupling to the one or more components using any suitable interface (e.g., a Universal Serial Bus (USB) interface, a High-Definition Multimedia Interface (HDMI) interface, a Controller Area Network (CAN) interface, a Serial Peripheral Interface (SPI) interface, an Ethernet interface, a wireless interface, or any other appropriate interface). For example, the computing device 700 may not include a display device 710, but may include display device interface circuitry (e.g., a connector and driver circuitry) to which an external display device 710 may be coupled.

The computing device 700 includes a processing device 702 (e.g., one or more processing devices). As used herein, the term "processing device" refers to any device or portion of a device that processes electronic data from registers and/or memory to transform such electronic data into other electronic data that may be stored in registers and/or memory. In various embodiments, the processing device 702 may include one or more digital signal processors (DSPs), application-specific integrated circuits (ASICs), central processing units (CPUs), graphics processing units (GPUs), or any other suitable processing devices.

The computing device 700 also includes a storage device 704 (e.g., one or more storage devices). In various embodiments, the storage device 704 may include one or more memory devices, such as random-access memory (RAM) devices (e.g., static RAM (SRAM) devices, magnetic RAM (MRAM) devices, dynamic RAM (DRAM) devices, resistive RAM (RRAM) devices, or conductive-bridging RAM (CBRAM) devices), hard-drive-based memory devices, solid-state memory devices, networked drives, or any combination of memory devices. In some embodiments, the storage device 704 may include memory that shares a die with the processing device 702. In such an embodiment, the memory may be used as cache memory and include embedded dynamic random-access memory (eDRAM) or spin transfer torque magnetic random-access memory (STT-MRAM), for example. In some embodiments, the storage device 704 may include non-transitory computer readable media having instructions thereon that, when executed by one or more processing devices (e.g., the processing device 702), cause the computing device 700 to perform any appropriate ones of the methods disclosed herein below or portions of such methods. In some examples, the storage device 704 is configured to hold a lookup table (LUT).

The computing device 700 further includes an interface device 706 (e.g., one or more interface devices 706). In various embodiments, the interface device 706 may include one or more communication chips, connectors, and/or other hardware and software to govern communications between the computing device 700 and other computing devices, e.g., as indicated above in reference to FIG. 6. For example, the interface device 706 may include circuitry for managing wireless communications for the transfer of data to and from the computing device 700. The term "wireless" and its derivatives may be used to describe circuits, devices, systems, methods, techniques, communications channels, etc., that may communicate data via modulated electromagnetic radiation through a nonsolid medium. The term does not imply that the associated devices do not contain any wires, although in some embodiments they might not. Circuitry included in the interface device 706 for managing wireless communications may implement any of a number of wireless standards or protocols, including but not limited to Institute for Electrical and Electronic Engineers (IEEE) standards including Wi-Fi (IEEE 802.11 family), IEEE 802.16 standards, Long-Term Evolution (LTE) project along with any amendments, updates, and/or revisions (e.g., advanced LTE project, ultramobile broadband (UMB) project (also referred to as "3GPP2"), etc.). In some embodiments, circuitry included in the interface device 706 for managing wireless communications may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. In some embodiments, circuitry included in the interface device 706 for managing wireless communications may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). In some embodiments, circuitry included in the interface device 706 for managing wireless communications may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other suitable wireless protocols. In some embodiments, the interface device 706 may include one or more antennas (e.g., one or more antenna arrays) configured to receive and/or transmit wireless signals.

In some embodiments, the interface device 706 may include circuitry for managing wired communications, such as electrical, optical, or any other suitable communication protocols. For example, the interface device 706 may include circuitry to support communications in accordance with Ethernet technologies. In some embodiments, the interface device 706 may support both wireless and wired communication, and/or may support multiple wired communication protocols and/or multiple wireless communication protocols. For example, a first set of circuitry of the interface device 706 may be dedicated to shorter-range wireless communications such as Wi-Fi or Bluetooth, and a second set of circuitry of the interface device 706 may be dedicated to longer-range wireless communications such as EDGE, GPRS, CDMA, WiMAX, LTE, EV-DO, or others. In some other embodiments, a first set of circuitry of the interface device 706 may be dedicated to wireless communications, and a second set of circuitry of the interface device 706 may be dedicated to wired communications.

The computing device 700 also includes battery/power circuitry 708. In various embodiments, the battery/power circuitry 708 may include one or more energy storage devices (e.g., batteries or capacitors) and/or circuitry for coupling components of the computing device 700 to an energy source separate from the computing device 700 (e.g., to AC line power).

In some embodiments, the computing device 700 may include a display device 710 (e.g., one or multiple individual display devices). In various embodiments, the display device 710 may include any visual indicators, such as a computer monitor, a touchscreen display, a liquid crystal display (LCD), or a flat panel display.

The computing device 700 also includes additional input/output (I/O) devices 712. In various embodiments, the I/O devices 712 may include one or more data/signal transfer interfaces, audio I/O devices, sensors (e.g., thermocouples or other temperature sensors, humidity sensors, pressure sensors, vibration sensors, etc.), image capture devices (e.g., one or more cameras), human interface devices (e.g., keyboards, cursor control devices, such as a mouse, a stylus, a trackball, or a touchpad), etc.

In some examples, the interface devices 706 and/or I/O devices 712 include one or more analog-to-digital converters (ADCs) for transforming received analog signals into a digital form suitable for operations performed by the processing device 702 and/or the storage device 704. In some additional examples, the interface devices 706 and/or I/O devices 712 include one or more digital-to-analog converters (DACs) for transforming digital signals provided by the processing device 702 and/or the storage device 704 into an analog form suitable for being communicated to other components of the lighting system 200 or of the control circuit 600.

Figure 8:
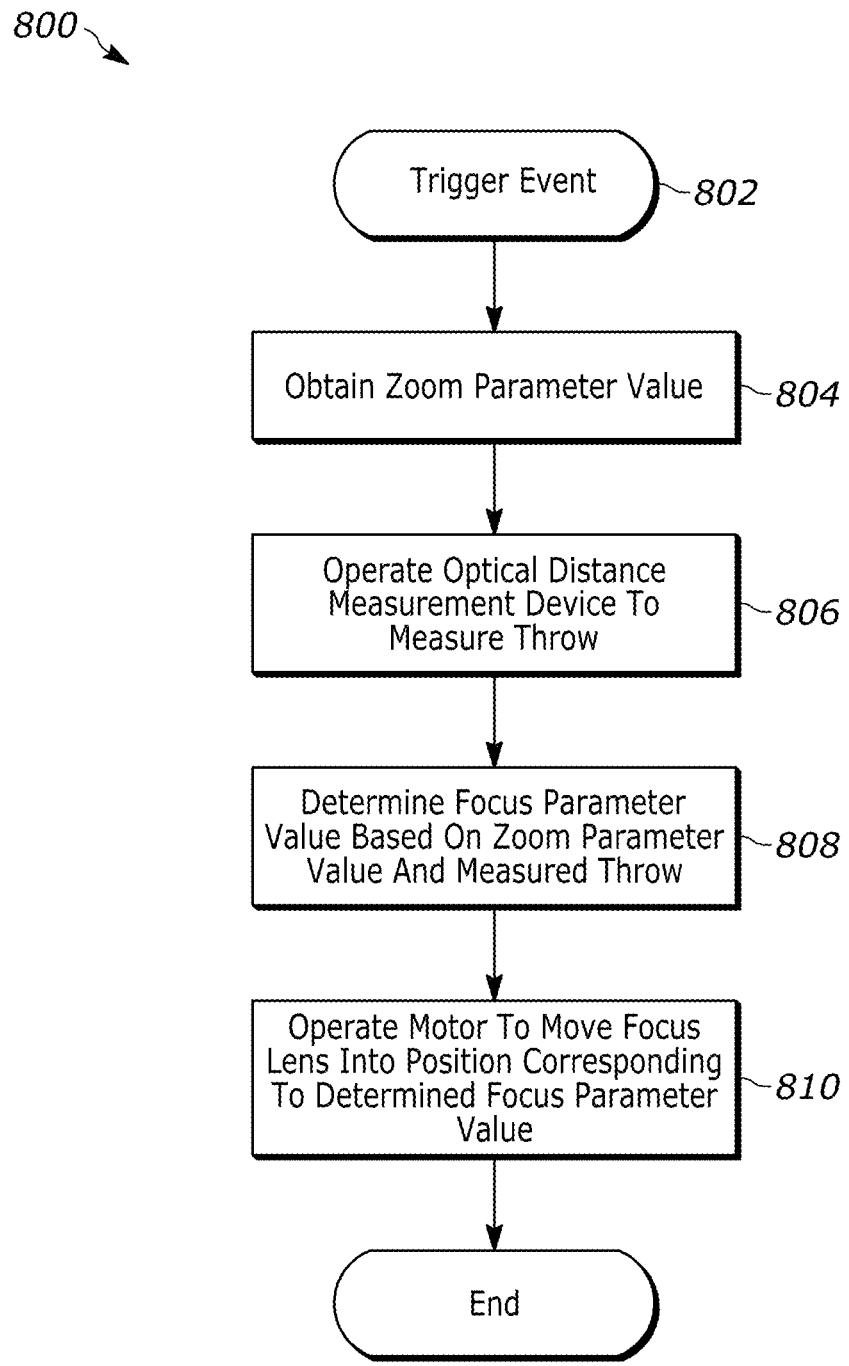
FIG. 8 is a flowchart of an automated focus-assistance method used in the lighting system of FIG. 2 according to some embodiments.

FIG. 8 is a flowchart of an automated focus-assistance method 800 according to some embodiments. In various examples, the method 800 is performed using the control circuit 600 or a pertinent portion thereof. In some examples, different processing blocks of the method 800 are executed by different respective parts (constituent control circuits) of the control circuit 600.

Execution of the method 800 is initiated by a trigger event 802. Some specific examples of the trigger event 802 include an appropriate user input through the control console 210, detection of a new or moving object in the field of view (FOV) of the lighting fixture 100, a sufficiently large movement of the light beam 202, and a queued operation of the pre-programmed lighting-control sequence executed using the control circuit 600. Some additional examples of the trigger event 802 are provided in the description of FIG. 12.

The method 800 includes the control circuit 600 reading a present zoom parameter value (in a block 804). As already indicated above, the zoom parameter value determines the position of the zoom lens group 440 in the optical assembly 400. In a representative example, the present zoom parameter value is retrieved, in the block 804, from the corresponding register of the motor controller 610. In some examples, a copy of the present zoom parameter value is also stored in the control console 210 and can be retrieved therefrom in the block 804.

The method 800 also includes the control circuit 600 operating the optical distance-measurement device 220 to measure the present distance to the projection surface 230 (in a block 806). In various examples of the block 806, the distance measurements are performed by the optical distance-measurement device 220 as described above in reference to FIGS. 2-3. When the distance measurement is completed, the electronic controller 310 proceeds to communicate a suitable representation of the measured distance (throw) to the motor controller 610 and/or to the control console 210 (in the block 806).

The method 800 further includes the control circuit 600 determining the focus parameter value based on the zoom parameter value and the measured distance (in a block 808). As already indicated above, the focus parameter value determines the position of the focus lens group 430 in the optical assembly 400. In different embodiments, the block 808 includes different respective sets of operations. For example, in one embodiment, operations of the block 808 include retrieving a corresponding focus parameter value from a prepopulated LUT, constructed such that the input of a zoom parameter value and a distance (throw) value causes the LUT to output the corresponding focus parameter value. In another embodiment, operations of the block 808 include computing the focus parameter value based on an optical model of the optical assembly 400. In various examples, the optical model is numerically simulated or is represented by an analytic solution (i.e., a mathematical formula or a set of mathematical formulas). In either case, in response to the zoom parameter value of the block 804 and the measured distance of the block 806, the computing device 702 that runs a program code representing the optical model computes the corresponding focus parameter value.

In a block 810 of the method 800, the control circuit 600 operates the motor coupled to the translation stage on which the focus lens group 430 is mounted in the optical assembly 400 to move the focus lens group 430 to the position corresponding to the focus parameter value determined in the block 808. After the focus lens group 430 is moved, the method 800 is terminated.

Figure 9:
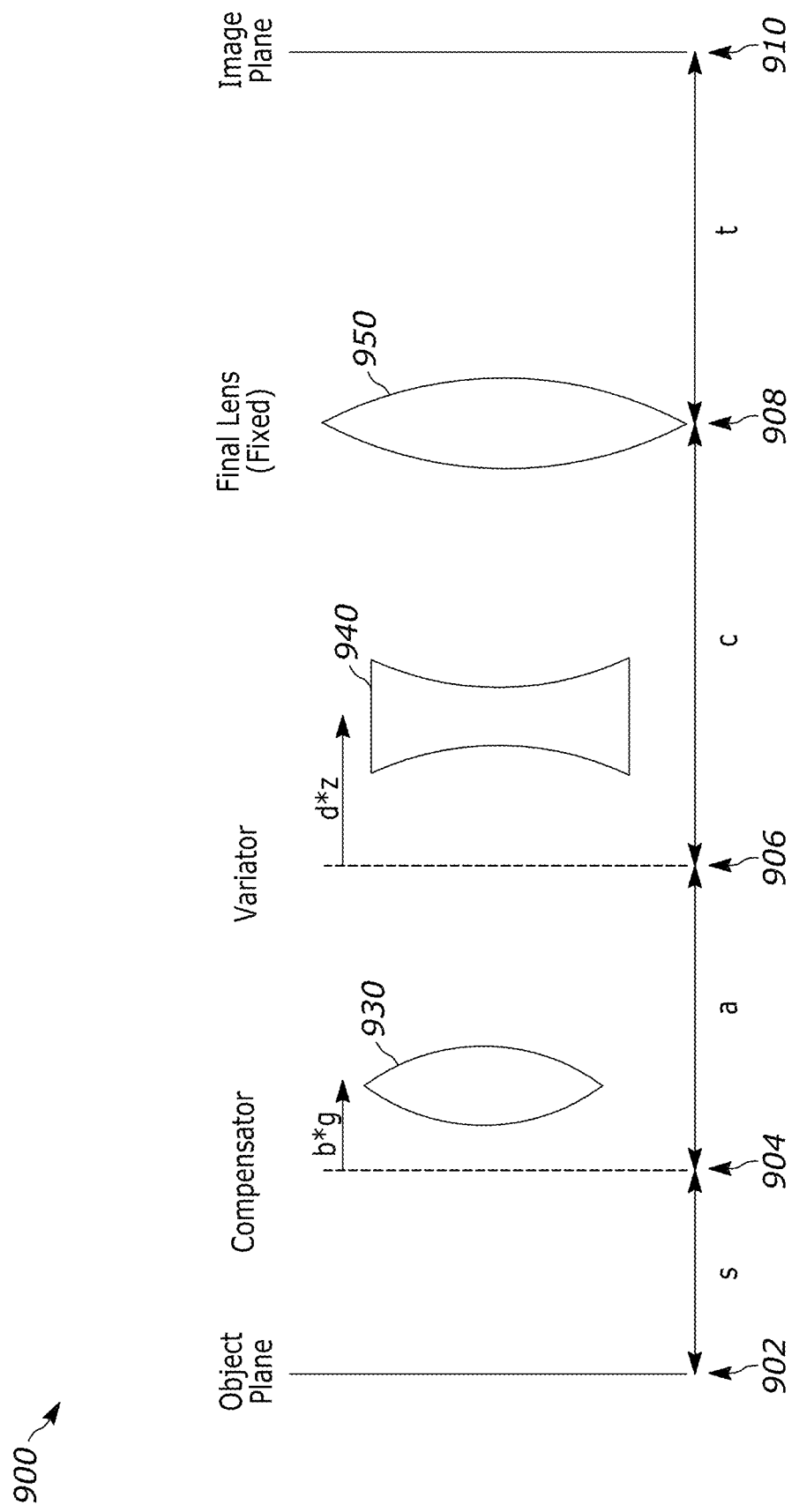
FIG. 9 is a schematic diagram illustrating an optical model used in the automated focus-assistance method of FIG. 8 according to one embodiment.

FIG. 9 is a schematic diagram illustrating an optical model 900 used in the method 800 according to one embodiment. The optical model 900 includes lenses 930, 940, and 950 configured to optically image an object plane 902 onto an image plane 910. The object plane 902 in the optical model 900 represents an object plane of the optical assembly 400. In some examples, a gobo used with the optical assembly 400 is located in or at the object plane thereof. The image plane 910 in the optical model 900 represents the projection surface 230. The lens 930, which is referred to as the "compensator." models the focus lens group 430. The lens 940, which is referred to as the "variator." models the zoom lens group 440. The lens 950, which is referred to as the "final lens," models the output lens 450. The compensator 930 and the variator 940 have their home positions at planes 904 and 906, respectively, and are independently movable as indicated by the respective arrows in FIG. 9. The final lens 950 has a fixed position 908.

The following nomenclature is used to denote various parameters and variables of the optical model 900:

s: distance from the object plane 902 to the compensator home position 904.

a: distance between the home positions 904 and 906.

c: distance from the variator home position 906 to the final lens position 908.

b: compensator motor rate (e.g., in mm/signal increment).

d: variator motor rate (e.g., in mm/signal increment)

f1, f2, f3: focal lengths of the compensator 930, variator 940, and final lens 950, respectively.

t: distance (throw) from the final lens position 908 to the image plane 910.

g: compensator motor signal.

z: variator motor signal.

Herein, t, g, and z are variables, and the remaining quantities are parameters of the optical model 900. The parameter values are set in accordance with the specific design of the optical assembly 400. Once the optical model 900 is properly parameterized and encoded in a program code, the program code enables the corresponding computing device 700 to compute an output value of a selected variable in response to receiving two input values representing the remaining two variables. For example, in one configuration, the program code representing the optical model 900 causes the corresponding computing device 700 to compute the value of the variable g in response to receiving the values of the variables t and z.

Figure 10:
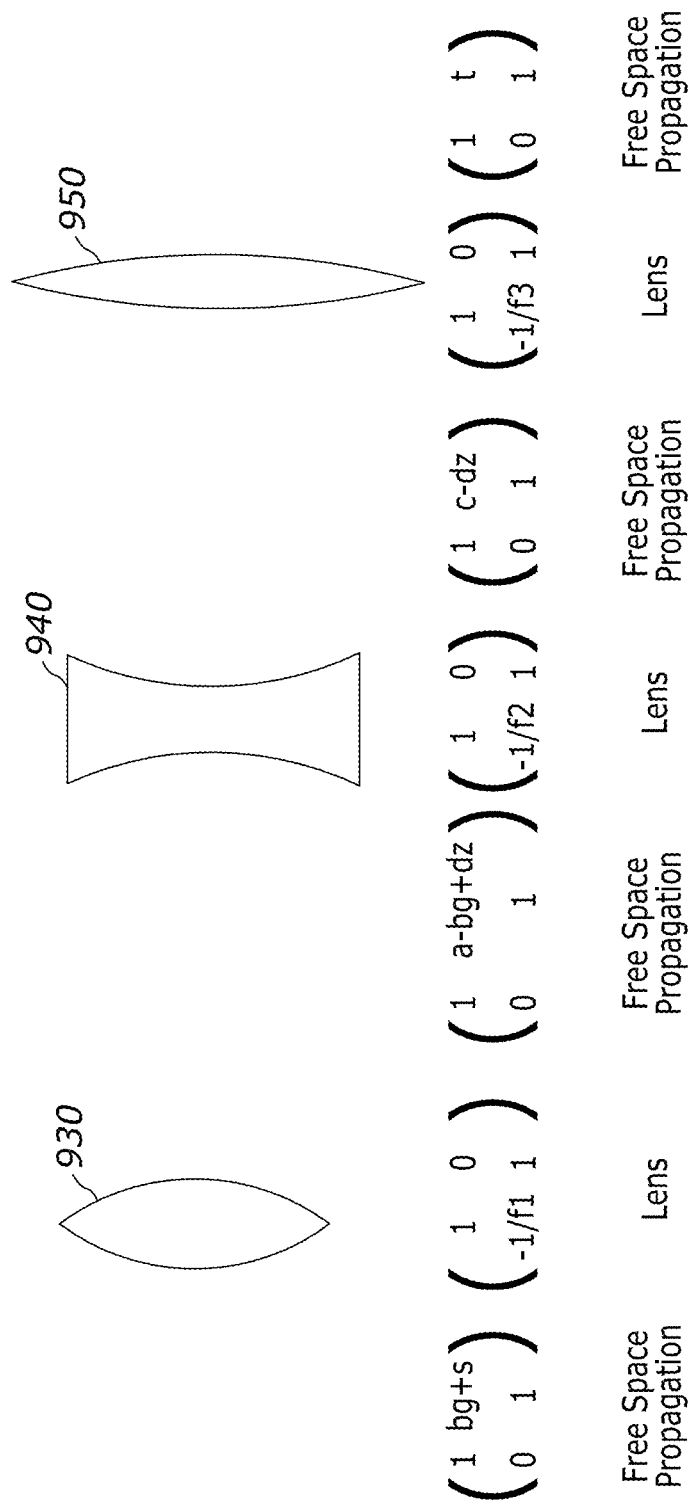
FIG. 10 is a diagram illustrating a ray transfer matrix analysis used to generate a program code representing the optical model of FIG. 9 according to one example.

FIG. 10 is a diagram illustrating a ray transfer matrix analysis used to generate a program code representing the optical model 900 according to one embodiment. In some literature, the ray transfer matrix analysis is referred to as the "ABCD matrix analysis." The ray transfer matrix analysis is a mathematical form for performing ray tracing calculations in problems in which the performance of the modeled optical system can be sufficiently accurately estimated by considering only paraxial rays. In the ray transfer matrix analysis, each optical element (e.g., a surface, an interface, a mirror, or a free space traversed by the optical rays) is described by a corresponding 2×2 ray transfer matrix which operates on a vector describing an incoming light ray to calculate the corresponding outgoing light ray. Multiplication of the successive 2×2 ray transfer matrices provides a concise ray transfer matrix describing the entire optical system. An example sequence of such 2×2 ray transfer matrices corresponding to the optical model 900 is shown in FIG. 10, with each of the matrices being shown next to the corresponding optical element.

In various additional embodiments, one or more of the following modifications to the optical model 900 can be implemented:

In some embodiments, the physical lens order is different from that indicated in FIGS. 4 and 9.

In some embodiments, at least some lenses are modeled as "thick" lenses.

In some embodiments, more than three model lenses representing the optical assembly 400 are used.

In some embodiments, at least some of the model parameters are directly experimentally measured.

In some embodiments, at least some of the model parameters are empirically determined by characterizing/calibrating the optical performance of the optical assembly 400 with a sufficient number of samples.

In some embodiments, the samples for characterizing/calibrating the optical performance of the optical assembly 400 are obtained by automated image processing.

In some embodiments, the optical model is used to obtain an analytic solution, e.g., a mathematical formula, that is coded in the program code representing the optical model.

In some embodiments, model computations and/or light fixture calibrations are used to compile a LUT that is subsequently used in the block 808 of the method 800 as indicated above.

In some embodiments, the user adjusts a "virtual variator," e.g., by specifying an image characteristic, such as the beam angle, magnification, or image size. This is pre-processed into the variator motor position, and then the main algorithm proceeds from there as described above.

In some parfocal zoom systems, lens spacings are constrained physically with a cam mechanism. Some embodiments disclosed herein can serve as a "virtual cam," which adjusts the projection optics based on the system's varifocal constraints.

Figure 11:
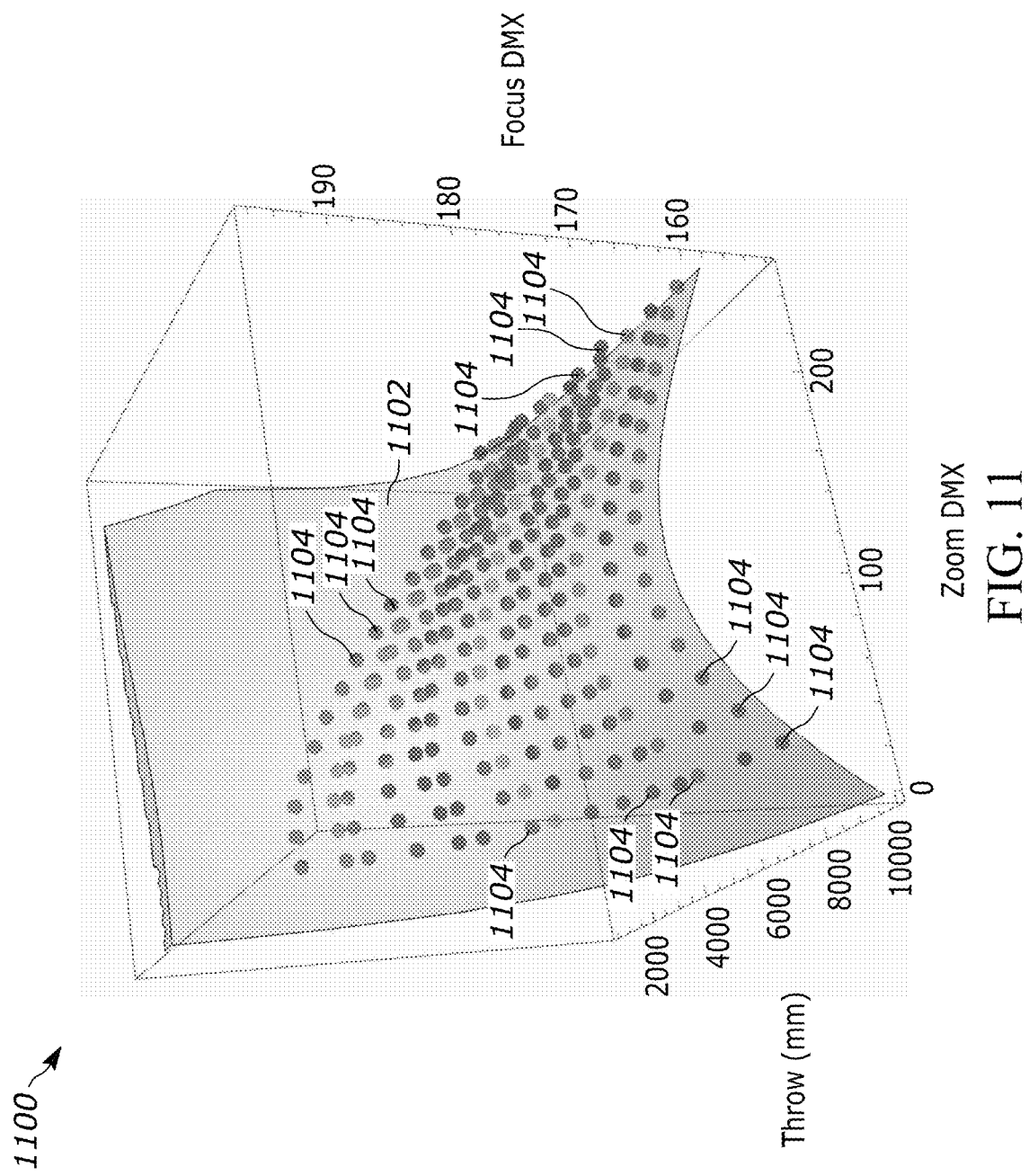
FIG. 11 is a graph illustrating a configuration space of the optical assembly of FIG. 4 according to some examples.

FIG. 11 is a graph 1100 illustrating a configuration space of the optical assembly 400 according to some embodiments. The graph 1100 includes a three-dimensional surface 1102, each point of which represents a respective configuration of the optical assembly 400 in which the pertinent internal or peripheral edge of the illuminated area 204 is in focus. The three dimensions (axes) of the graph 1100 are the throw, the motor signal (referred to as "zoom DMX") of the motor moving the zoom lens group 440, and the motor signal (referred to as "focus DMX") of the motor moving the focus lens group 430.

In different embodiments, different methods are used to generate the surface 1102. In one embodiment, the surface 1102 is generated using a ray transfer matrix analysis applied to the optical model 900 (also see FIG. 10). In another embodiment, the surface 1102 is generated using an analytical solution of the system of geometric optics equations describing the optical model 900. In yet another embodiment, the surface 1102 is generated using a suitable calibration procedure. In a representative example, the calibration procedure includes experimentally finding a plurality of configuration points 1104 in the three-dimensional space of (throw, zoom DMX, focus DMX) for each of which the pertinent internal or peripheral edge of the illuminated area 204 is in focus. In the graph 1100, an example plurality of such experimentally found configuration points 1104 is explicitly shown. The calibration procedure further includes fitting the plurality of the experimentally found configuration points 1104 using a suitable least mean squares (LMS) algorithm to find the corresponding surface 1102. In some examples, a LUT can be generated by appropriately sampling the surface 1102. The generated LUT can then be accessed to perform the LUT operations of the block 808 in the method 800 as indicated above.

Figure 12:
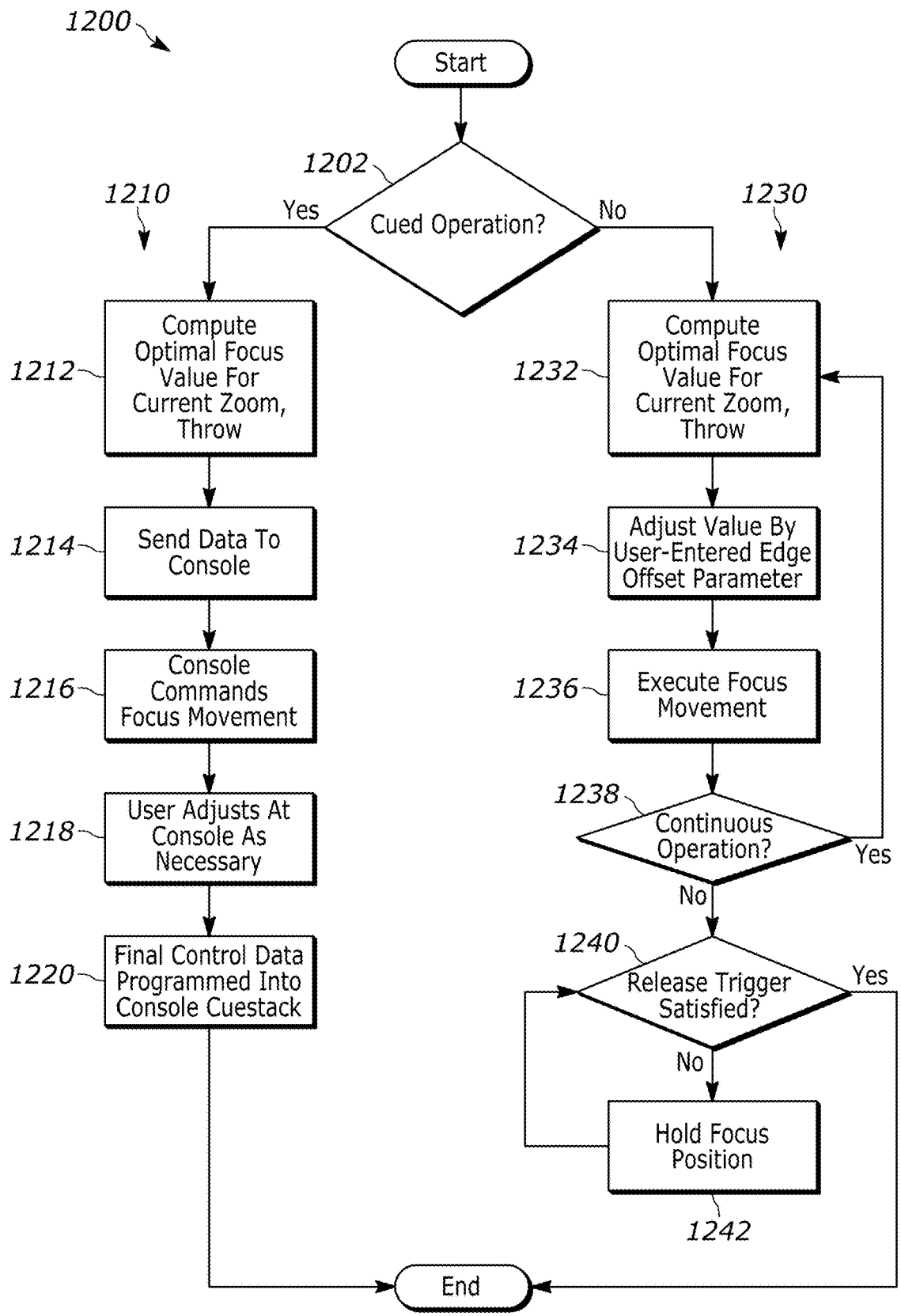
FIG. 12 is a flowchart of a control method used in the lighting system of FIG. 2 according to some embodiments.

FIG. 12 is a flowchart of a control method 1200 according to some embodiments. In various examples, the method 1200 is performed using the control circuit 600 or pertinent parts thereof. Some operations of the method 1200 include receiving user input through the control console 210.

The method 1200 has two branches, labeled 1210 and 1230, respectively. A decision block 1202 is used to direct the processing flow of the method 1200 through the branch 1210 or the branch 1230. For cue stack programming operations ("Yes" at the decision block 1202), the processing flow is directed through the branch 1210, which includes operations of blocks 1212-1220. For other operations ("No" at the decision block 1202), the processing flow is directed through the branch 1230, which includes operations of blocks 1232-1242.

In an example embodiment, cues are used to automatically change the lighting look on stage. Those looks can be stored and then called up in a sequential fashion (e.g., each cue is a step in the corresponding sequence). Cues are stored in the cue stack according to their number, which can range, e.g., from Cue 0.01 to Cue 999.99. Cues are created and edited from the control console 210 and can store positions, intensities, or other specific parameter data for any selected channel. Unlike presets, cues can have specific timing(s) associated with them as a whole or on an individual channel basis. Once created, cues can be loaded from the cue stack or Playback Screen. Loading a cue prepares the control console 210 to execute the contents of that cue. An associated cue stack is typically saved with the light show file.

The block 1212 of the branch 1210 includes operations of the blocks 804-808 of the method 800 corresponding to the present zoom parameter value and throw. As already indicated above, these operations are typically performed at the lighting fixture 100. The block 1214 includes the luminaire controller 620 sending the corresponding data, e.g., including the measured throw, zoom DMX, and computed focus DMX, to the control console 210. The block 1216 includes the control console 210 sending a command to the lighting fixture 100 to move the focus lens group 430 in accordance with the computed focus DMX, along with other appropriate commands (if any). The block 1218 includes the control console 210 receiving a user input (if any) for the configuration adjustment for the lighting fixture 100. In various examples, the configuration adjustment may be based on visual or sensor-aided inspection of the illuminated area 204 and/or subjective creative intent of the user. In some examples, the configuration adjustment may be performed in the block 1218 in an iterative or incremental manner, e.g., until the appearance of the illuminated area 204 is judged as satisfactory. Once the configuration adjustment via the user input(s) is completed, the final control data are programmed into the corresponding cue stack in the block 1220. Thereafter, the processing corresponding to the branch 1210 of the method 1200 is terminated.

The block 1232 of the branch 1230 includes operations of the blocks 804-808 of the method 800 corresponding to the present zoom parameter value and throw. The block 1234 includes the control circuit 600 adjusting the focus parameter value obtained in the block 1232 by an offset value. In different examples, the offset value can be preprogrammed into the corresponding cue or be entered by the user through the control console 210. The block 1234 includes the motor controller 610 operating the corresponding motor to move the focus lens group 430 to the position corresponding to the adjusted focus parameter value of the block 1234.

The decision block 1238 of the branch 1230 is used to distinguish sequences of a continuous operating mode and a single-shot operating mode. The continuous operating mode includes continuously looping through the operations of the blocks 1232-1236, e.g., with a selected fixed time delay between the consecutive loops. The single-shot operating mode includes executing a single sequence of the blocks 1232-1236 and then holding the focus lens group 430 in the fixed position (in the block 1242) until the focus hold is released ("Yes" at the decision block 1240). Example triggers for the release of a single shot focus hold at the decision block 1240 may include timing parameters, advancement of the cue stack to a subsequent cue, specific distance criteria checked based on the distance measured by the corresponding distance measurement device 220, and so on. Thereafter, the processing corresponding to the branch 1230 of the method 1200 is terminated.

Figure 13:
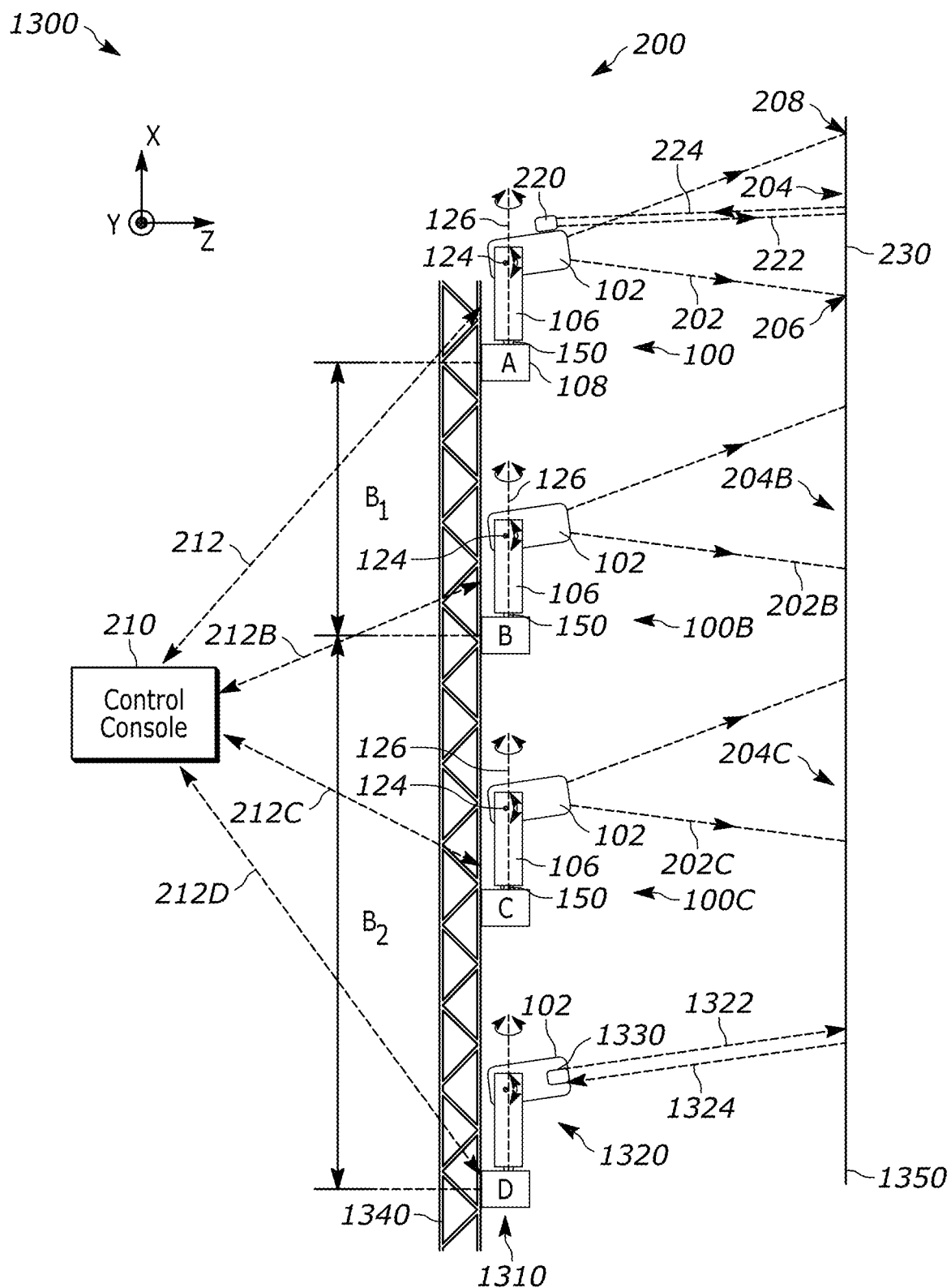
FIG. 13 is a block diagram illustrating a lighting system according to some additional embodiments.

FIG. 13 is a block diagram illustrating a lighting system 1300 according to some embodiments. The lighting system 1300 includes the lighting system 200 (FIG. 2) as a subsystem thereof. Additionally, the lighting system 1300 includes lighting fixtures 100B and 100C. Unlike the lighting fixture 100 of the lighting subsystem 200, the lighting fixtures 100B and 100C are not equipped with their own instances of the distance-measurement device 220. In some embodiments, the lighting fixtures 100B and 100C are separate instances (e.g., nominal copies) of the lighting fixture 100, various features of which have been described above in reference to FIGS. 1-12. In some other embodiments, the lighting fixtures 100B and 100C may be of a different but functionally similar motorized design, e.g., belonging to a different maker of motorized (e.g., movable, translatable, and/or rotatable) light fixtures than the maker of the lighting fixture 100.

The lighting system 1300 also includes a distance-measurement device 1320, which is a standalone distance-measurement device. Herein, the term "standalone" means that the distance-measurement device 1320 is not directly attached to or mounted on a corresponding lighting fixture. That is, the distance-measurement device 1320 does not include an instance of the optical assembly 400 or a functional equivalent thereof and, as such, does not generate or project an illumination light beam that might be similar to the light beam 202. In the example shown, the distance-measurement device 1320 includes a distance-measurement sensor 1330 mounted to a pan-and-tilt apparatus 1310 containing no primary illumination function therein. In one nonlimiting example, the pan-and-tilt apparatus 1310 is implemented by removing the optical assembly 400 and other pertinent projection optics from an instance of the lighting fixture 100 and placing the distance-measurement sensor 1330 into the corresponding space inside the housing 102, e.g., as indicated in FIG. 13. In some examples, the distance-measurement sensor 1330 can be an instance (nominal copy) of the distance-measurement device 220. In other examples, the distance-measurement sensor 1330 can be implemented using any one of the above-described distance-measurement devices (optical or non-optical). Various alternative implementations of the pan-and-tilt apparatus 1310 can similarly be used in some embodiments of the distance-measurement device 1320.

In the example shown, the lighting fixtures 100, 100B, and 100C and the distance-measurement device 1320 are mounted along a truss 1340 at different respective locations, labeled A, B, C, and D, respectively. In other examples, the lighting fixtures 100, 100B, and 100C and the distance-measurement device 1320 may be mounted on different respective support structures, such as different trusses, pipes, rigs, and the like. In some examples, the truss 1340 or at least some of the different respective support structures may be movable with respect to the corresponding theater-stage or light-show environment.

In operation, the lighting fixtures 100, 100B, and 100C project light beams 202, 202B, and 202C, respectively, onto a projection surface 1350. The light beams 202, 202B, and 202C can be independently tilted and panned by operating each of the lighting fixtures 100, 100B, and 100C, e.g., as described above, thereby causing the corresponding movement of the respective illuminated areas 204, 204B, and 204C along the projection surface 1350. Although the illuminated areas 204, 204B, and 204C are shown in FIG. 13 as non-overlapping, there might be times at which two or more of such illuminated areas overlap in some portions of the projection surface 1350. Although the projection surface 1350 is shown in FIG. 13 as being planar, in different additional examples, the projection surface 1350 may have a nonplanar, multiplanar, curved, or more-complex topology.

In some examples, the distance-measurement sensor 1330 of the distance-measurement device 1320 operates to send an optical probe beam 1322 toward the projection surface 1350. The optical probe beam 1322 is reflected from the projection surface 1350, and a portion 1324 of the reflected optical beam returns to the distance measurement sensor 1330. The pan-and-tilt apparatus 1310 can be operated to direct the optical probe beam 1322 to different parts of the projection surface 1350 as needed. Although the optical probe beam 1322 is shown in FIG. 13 as hitting the projection surface 1350 outside the illuminated areas 204, 204B, and 204C, there might be times and configurations in which the optical probe beam 1322 hits the projection surface 1350 inside one of the illuminated areas 204, 204B, and 204C or inside an overlap area of the two or more illuminated areas.

Various functions/features of the lighting fixtures 100, 100B, and 100C and the distance-measurement device 1320 are controlled with the control console 210 via DMX control signals 212, 212B, 212C, and 212D, respectively. In some examples, the lighting system 1300 may include one or more additional instances of the lighting fixture 100 (each of which is equipped with the corresponding instance of the distance-measurement device 220), one or more additional instances of the lighting fixture 100B or 100C (which are not equipped with their own instances of the distance-measurement device 220), and one or more additional instances of the standalone distance-measurement device 1320. Such additional instances may be similarly controlled by the control console 210 via the corresponding DMX control signals.

In some examples, the lighting system 1300 operates to provide automated focus assistance to the lighting fixtures 100B and 100C based on distance measurements performed by one or both of the distance-measurement devices 220 and 1320. The corresponding automated focus-assistance method is a modification of the above-described automated focus-assistance method 800. In one example, the modified method 800 has a modified block 806 and a modified block 808 (also see FIG. 8). More specifically, operations of the modified block 806 include obtaining an estimated throw value for the lighting fixture 100B (or 100C) based on the distance measurements performed by the distance-measurement devices 220 and/or 1320. In some implementations, such obtaining includes receiving the estimated throw value from the control console 210 via the DMX control signal 212B (or 212C). In some examples, all of the computations directed at estimating the throw value may be performed in one specific portion (e.g., the control console 220) of the corresponding control circuit or distributed over several different portions of the corresponding control circuit (also see FIG. 6). Illustrative examples of such computations are described in more detail below in reference to FIG. 14. Operations of the modified block 808 include determining the focus parameter value for the lighting fixture 100B (or 100C) based on the zoom parameter value thereof and the estimated throw value obtained in the modified block 806.

Figure 14:
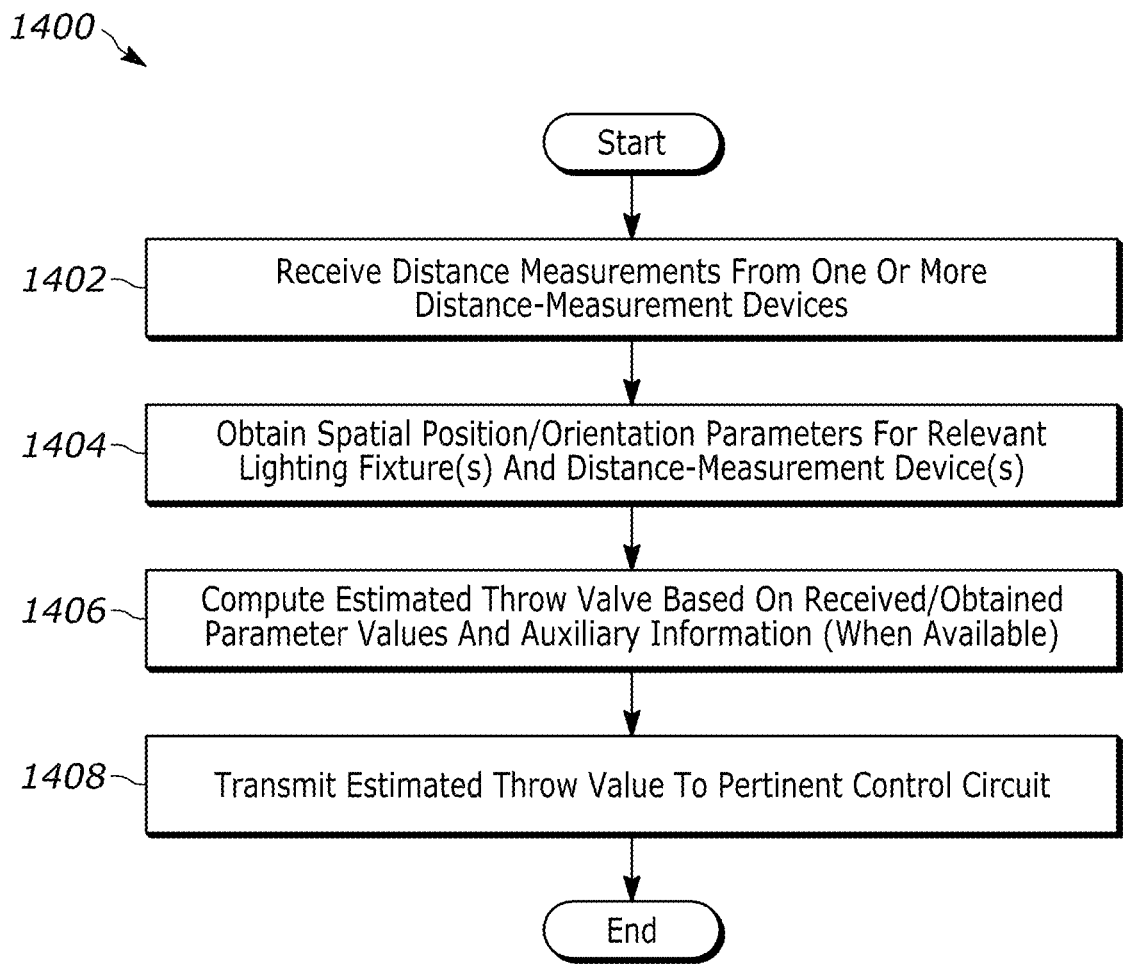
FIG. 14 is a flowchart of an automated method of estimating a throw value in the lighting system of FIG. 13 according to some embodiments.

FIG. 14 is a flowchart of an automated method 1400 of estimating a throw value in the lighting system 1300 according to some embodiments. For illustration purposes and without any implied limitations, the automated method 1400 is described as being directed at providing an estimated throw value for the lighting fixture 100B based on the distance measurement(s) performed by the distance-measurement device 220 and/or the distance-measurement device 1320 and being run on the control console 210. In various additional examples, some portions of the automated method 1400 may be implemented using other pertinent parts of the corresponding control circuit, such as, e.g., the pertinent parts of the control circuit 600 (FIG. 6). Based on the provided description, a person of ordinary skill in the pertinent art will be able to make and use various suitably distributed versions of the automated method 1400 without any undue experimentation. A separate instance of the automated method 1400 may be similarly run to estimate a throw value for the lighting fixture 100C.

The automated method 1400 includes the control console 210 receiving distance measurements from one or both of the distance-measurement devices 220 and 1320 (in a block 1402). Each of the distance-measurement devices 220 and 1320 performs the respective distance measurement, e.g., as described above. Each of the distance-measurement devices 220 and 1320 then transmits digital values representing the measured distance(s) to the control console 210 via the respective one of the DMX control signals 212 and 212D. In some examples, the distance-measurement device 220 uses the pertinent circuitry of the lighting fixture 100, e.g., as described above, to transmit such digital values to the control console 210.

The automated method 1400 also includes the control console 210 obtaining (in a block 1404) spatial position/orientation parameters for the lighting fixtures 100 and 100B and the distance-measurement device 1320. When the lighting fixtures 100 and 100B and the distance-measurement device 1320 have fixed positions, the spatial orientation parameters obtained in the block 1404 include values representing the respective pan and tilt angles for each of the lighting fixtures 100 and 100B and the distance-measurement device 1320. Herein below, the tilt and pan angles are denoted as $\theta$ and $\varphi$, respectively. When some or all of the lighting fixtures 100 and 100B and the distance-measurement device 1320 are movable, e.g., along the truss 1340, position changes with respect to the respective reference (e.g., home) positions are also obtained by the control console 210 in the block 1404.

In some configurations of the lighting system 1300, the control console 210 may "know" the spatial position/orientation parameters for the lighting fixtures 100 and 100B and for the distance-measurement device 1320 by virtue of executing operative control over such parameters. In such configurations, operations of the block 1404 include reading the corresponding parameter values from the memory of the control console 210. In some other configurations of the control circuit of the lighting system 1300, operations of the block 1404 may include requesting and receiving some or all of the spatial position/orientation parameter values from the corresponding parts of the control circuit located at the lighting fixtures 100 and/or 100B and/or the distance-measurement device 1320. Such requesting and receiving may be performed, e.g., using the DMX control signals 212, 212A, and 212D.

The automated method 1400 further includes the control console 210 computing an estimated throw value $t_B$ for the lighting fixture 100B (in a block 1406). In various examples, the computations of the block 1406 are based on the various parameter values obtained/received in the blocks 1402 and 1404 and may be further based on pertinent auxiliary information (if any) available at the control console 210. In a representative example, a throw-estimation algorithm employed in the block 1406 relies on one or more of the following input parameter subsets obtained/received in the blocks 1402 and 1404:

$t_A$: measured throw value for the lighting fixture 100;
$(\theta_A, \varphi_A)$: tilt and pan angles for the lighting fixture 100;
$t_D$: measured throw value for the distance-measurement device 1320;
$(\theta_D, \varphi_D)$: tilt and pan angles for the distance-measurement device 1320;
$(\theta_B, \varphi_B)$: tilt and pan angles for the lighting fixture 100B;
$(\Delta X_{AB}, \Delta Y_{AB}, \Delta Z_{AB})$: three-dimensional (3D) spatial offsets between the positions A and B; and
$(\Delta X_{BD}, \Delta Y_{BD}, \Delta Z_{BD})$: 3D spatial offsets between the positions B and D.

The cartesian coordinate system XYZ in which the 3D spatial offsets can be measured is indicated in FIG. 13 by the corresponding XYZ coordinate triad. In that coordinate system, the above-indicated 3D spatial offsets for the spatial configuration of the lighting system 1300 illustrated in FIG. 13 have the following values: $\Delta X_{AB} = B_1$; $\Delta X_{BD} = B_2$; $\Delta Y_{AB} = \Delta Z_{AB} = \Delta Y_{BD} = \Delta Z_{BD} = 0$.

In some examples, the auxiliary information available at the control console 210 for the computations performed in the block 1406 may include some or all of:

(i) information about the general shape of the projection surface 1350, such as "planar," "spherical," or "cylindrical;"
(ii) orientation of the truss 1340 with respect to the projection surface 1350 or in the XYZ coordinate system;
(iii) depth map of the projection surface 1350 from the position A; and
(iv) depth map of the projection surface 1350 from the position D.

In some examples, the depth map of the projection surface 1350 from the fixed position A is constructed and gradually updated based on the throw values $t_A$ measured for different angular orientations $(\theta_A, \varphi_A)$ of the lighting fixture 100. Similarly, the depth map of the projection surface 1350 from the fixed position D is constructed and gradually updated based on the throw values $t_D$ measured for different angular orientations $(\theta_D, \varphi_D)$ of the distance-measurement device 1320.

In various examples, the above-indicated input parameters and auxiliary information typically over-define the corresponding mathematical problem of computing the estimated throw value $t_B$, which is being solved in the block 1406. As such, the computation of $t_B$ can be performed in the block 1406 in a number of different ways, e.g., by selecting a suitable subset of mathematically sufficient problem constraints from the entirety of available parameters and/or auxiliary information. The over-definition of the corresponding mathematical problem also enables the throw-estimation algorithm executed by the control console 210 to perform consistency checks and compute an estimated error attributed to the $t_B$ value computed thereby in the block 1406.

In rare instances in which the corresponding mathematical problem is not over-defined, the control console 210 may command the distance-measurement device 1320 to orient itself such that the probe beam 1322 hits the projection surface 1350 within the illuminated area 204B and to measure the corresponding throw value $t_D$ in that orientation. With that $t_D$ measurement, the corresponding mathematical problem of computing the estimated throw value $t_B$ becomes a straightforward triangulation problem, which is then solved by the throw-estimation algorithm employed in the block 1406.

Following the computation of $t_B$ in the block 1406, operations of the automated method 1400 include the control console 210 transmitting (in a block 1408) the computed $t_B$ value to the responsible control entity executing the above-mentioned modified focus-assistance method 800. In some examples, the responsible control entity is located in the lighting fixture 100B. By receiving the computed $t_B$ value from the control console 210, the responsible control entity implements the above-described modified block 806 of the modified focus-assistance method 800 in at least some examples. Subsequently, the responsible control entity may execute the above-described modified block 808 and operations of the block 810 of the modified focus-assistance method 800. After the operations of the block 1408 are completed, the method 1400 is terminated.

According to one example disclosed above, e.g., in the summary section and/or in reference to any one or any combination of some or all of FIGS. 1-14, provided is an apparatus, comprising: an optical assembly to project a light beam generated with a first light source onto a projection surface, the optical assembly being movable with respect to the projection surface and including a first lens, a second lens, and a third lens arranged along an optical axis of the optical assembly, the second lens and the third lens being independently translatable with respect to the first lens to different positions along the optical axis; an optical distance-measurement device optically aligned with the optical assembly to provide a measure of a distance between the optical assembly and the projection surface, the optical distance-measurement device being movable together with the optical assembly; and a control circuit configured to determine an estimated position of the third lens with which an edge of an area illuminated by the light beam on the projection surface is in focus, the estimated position being determined based on the measure and further based on a present position of the second lens.

In some examples of the above apparatus, the apparatus further comprises a first motor to translate the third lens along the optical axis, wherein the control circuit is further configured to operate the first motor to place the third lens into the estimated position.

In some examples of any of the above apparatus, the apparatus further comprises: a frame rotatably connected to a base; a housing rotatably connected to the frame, with the optical assembly being mounted in the housing; a second motor to rotate the frame with respect to the base about a first rotation axis; and a third motor to rotate the housing with respect to the frame about a second rotation axis oriented at a nonzero angle with respect to the first rotation axis, wherein the control circuit is further configured to operate the second motor and the third motor to move the optical assembly with respect to the projection surface.

In some examples of any of the above apparatus, the base is movable with respect to the projection surface.

In some examples of any of the above apparatus, the control circuit comprises an electronic controller located in the housing.

In some examples of any of the above apparatus, the control circuit further comprises a control console configured to control a plurality of lighting fixtures, wherein one of the lighting fixtures includes the base, the frame, the housing, the optical assembly, the first motor, the second motor, the third motor, and the electronic controller.

In some examples of any of the above apparatus, the optical distance-measurement device comprises: a second light source to emit a probe beam toward the projection surface; a driver circuit to electrically drive the second light source to cause the probe beam to be pulsed, intensity-modulated, or frequency-modulated; and an optical receiver to detect a returned beam formed by reflections of the probe beam from the projection surface, wherein the optical distance-measurement device is configured to obtain the measure by comparing one or more characteristics of the probe beam and the returned beam.

In some examples of any of the above apparatus, the first light source is configured to emit visible light; and wherein the second light source is configured to emit infrared light.

In some examples of any of the above apparatus, the optical distance-measurement device comprises a lidar ranging sensor.

In some examples of any of the above apparatus, the control circuit is configured to determine the estimated position using a lookup table addressable with a pair of values consisting of a distance value and a second-lens position value.

In some examples of any of the above apparatus, the control circuit is configured to determine the estimated position based on calibration data.

In some examples of any of the above apparatus, the control circuit is configured to determine the estimated position based on a numerical model of the optical assembly.

In some examples of any of the above apparatus, the control circuit is configured to determine the estimated position based on an analytical solution of a system of equations describing optical characteristics of the optical assembly.

In some examples of any of the above apparatus, the control circuit includes a multifunctional control console configured to control a plurality of lighting fixtures, with controllable features thereof being selected from the group consisting of a panning movement, a tilting movement, a translation movement, a color of light, an intensity of light, an optical zoom, an optical focus, a gobo, an iris, a framing shutter, and timing of one or more lighting-fixture operations.

In some examples of any of the above apparatus, the optical distance-measurement device is optically aligned with the optical assembly such that the measure corresponds to a peripheral edge of the area illuminated by the light beam.

In some examples of any of the above apparatus, the optical distance-measurement device is optically aligned with the optical assembly such that the measure corresponds to an interior edge within the area illuminated by the light beam.

According to another example disclosed above, e.g., in the summary section and/or in reference to any one or any combination of some or all of FIGS. 1-14, provided is a method of providing focus assistance for a lighting fixture, the method comprising: obtaining, with an electronic processor, a first parameter value representing an axial position of a second lens in an optical assembly including a first lens, the second lens, and a third lens arranged along an optical axis of the optical assembly, the second lens and the third lens being independently translatable with respect to the first lens to different positions along the optical axis; obtaining, with the electronic processor, a measure of a distance between the lighting fixture and a projection surface; and determining, with the electronic processor, a second parameter value representing an estimated position of the third lens with which an edge of an area illuminated by the lighting fixture on the projection surface is in focus, the second parameter value being determined based on the measure and further based on the first parameter value.

In some examples of the above method, the method further comprises programming, with the electronic processor, the second parameter value or an adjusted value into a cue, the adjusted value being obtained by changing the second parameter value based on a user input.

In some examples of any of the above methods, the method further comprises controlling, with the electronic processor, a motor configured to translate the third lens along the optical axis, said controlling causing the motor to place the third lens into a position corresponding to the second parameter value.

According to yet another example disclosed above, e.g., in the summary section and/or in reference to any one or any combination of some or all of FIGS. 1-14, provided is a non-transitory computer-readable medium storing instructions that, when executed by at least one processor, cause the at least one processor to perform operations comprising any one of the above methods.

According to yet another example disclosed above, e.g., in the summary section and/or in reference to any one or any combination of some or all of FIGS. 1-14, provided is a lighting system, comprising: a first lighting fixture (e.g., 100B, FIG. 13) including a first optical assembly configured to project a first light beam onto a projection surface, the first optical assembly being rotatable with respect to the projection surface and including a first lens, a second lens, and a third lens arranged along an optical axis of the first optical assembly, the second lens and the third lens being independently translatable with respect to the first lens to different positions along the optical axis of the first optical assembly; a first distance measurement device (e.g., 220 or 1330, FIG. 13) mounted on a first pan-and-tilt apparatus (e.g., 1310 or the analogous part of 100, FIG. 13) and configured to provide a measure of a distance between the first distance measurement device and the projection surface, the first distance-measurement device being rotatable with respect to the projection surface by operation of the first pan-and-tilt apparatus, the first distance-measurement device and the first optical assembly being rotatable independent of one another; and a control circuit configured to determine an estimated position of the third lens with which an edge of an area illuminated by the first light beam on the projection surface is in focus, the estimated position being determined based on the measure and further based on an axial position of the second lens in the first optical assembly.

In some examples of the above lighting system, the lighting system comprises a control console (e.g., 210, FIG. 13) configured to: receive (e.g., 1402, FIG. 14) the measure from the first distance measurement device via a first communication channel; obtain (e.g., 1404, FIG. 14) respective angular orientation parameters for the first optical assembly and for the first distance measurement device; and compute (e.g., 1406, FIG. 14) an estimated throw value for the first lighting fixture based on the measure and the respective angular orientation parameters, wherein the control circuit is configured to determine the estimated position of the third lens based on the estimated throw value.

In some examples of any of the above lighting systems, the control console is further configured to communicate (e.g., 1408, FIG. 14) the estimated throw value to the control circuit via a second communication channel.

In some examples of any of the above lighting systems, the first lighting fixture comprises a first motor (e.g., 530, FIG. 5) configured to translate the third lens along the optical axis of the of the first optical assembly; and wherein the first lighting fixture is configured to operate the first motor to place the third lens into the estimated position.

In some examples of any of the above lighting systems, the first lighting fixture further comprises a second motor (e.g., 510, FIG. 5) configured to translate the second lens along the optical axis of the of the first optical assembly to change the axial position.

In some examples of any of the above lighting systems, the lighting system further comprises a second lighting fixture (e.g., 100, FIG. 13) configured to project a second light beam onto the projection surface, wherein the second lighting fixture includes the first pan-and-tilt apparatus; and wherein the first pan-and-tilt apparatus is configured to pan and tilt the second light beam.

In some examples of any of the above lighting systems, the second lighting fixture includes a second optical assembly configured to project the second light beam onto the projection surface, the second optical assembly being mounted on the first pan-and-tilt apparatus to rotate together with the first distance measurement device (e.g., 220, FIG. 13) and including a fourth lens, a fifth lens, and a sixth lens arranged along an optical axis of the second optical assembly, the fifth lens and the sixth lens being independently translatable with respect to the fourth lens to different positions along the optical axis of the second optical assembly.

In some examples of any of the above lighting systems, the control circuit is further configured to determine an estimated position of the sixth lens with which an edge of an area illuminated by the second light beam on the projection surface is in focus, the estimated position of the sixth lens being determined based on the measure and further based on an axial position of the fifth lens in the second optical assembly.

In some examples of any of the above lighting systems, the lighting system further comprises a second lighting fixture (e.g., 100, FIG. 13) configured to project a second light beam onto the projection surface, the second lighting fixture including a second pan-and-tilt apparatus configured to pan and tilt the second light beam.

In some examples of any of the above lighting systems, the lighting system further comprises a second distance measurement device (e.g., 220, FIG. 13) mounted on the second pan-and-tilt apparatus and configured to provide a measured value representing a distance between the second distance measurement device and the projection surface, the second distance-measurement device being rotatable with respect to the projection surface by operation of the second pan-and-tilt apparatus, wherein the first optical assembly, the first distance-measurement device (e.g., 1330, FIG. 13), and the second distance-measurement device are rotatable independent of each another.

In some examples of any of the above lighting systems, the second lighting fixture includes a second optical assembly configured to project the second light beam onto the projection surface, the second optical assembly being mounted on the second pan-and-tilt apparatus to rotate together with the second distance measurement device and including a fourth lens, a fifth lens, and a sixth lens arranged along an optical axis of the second optical assembly, the fifth lens and the sixth lens being independently translatable with respect to the fourth lens to different positions along the optical axis of the second optical assembly.

In some examples of any of the above lighting systems, the control circuit is further configured to determine an estimated position of the sixth lens with which an edge of an area illuminated by the second light beam on the projection surface is in focus, the estimated position of the sixth lens being determined based on the measured value and further based on an axial position of the fifth lens in the second optical assembly.

In some examples of any of the above lighting systems, the control circuit is further configured to determine the estimated position of the third lens based on the measured value.

In some examples of any of the above lighting systems, the lighting system comprises a control console (e.g., 210, FIG. 13) configured to: receive (e.g., 1402, FIG. 14) the measure from the first distance measurement device via a first communication channel; receive (e.g., 1402, FIG. 14) the measured value from the second distance measurement device via a second communication channel; obtain (e.g., 1404, FIG. 14) respective angular orientation parameters for the first optical assembly, for the second optical assembly, and for the first distance measurement device; and compute (e.g., 1406, FIG. 14) an estimated throw value for the first lighting fixture based on the measure, the measured value, and the respective angular orientation parameters, wherein the control circuit is configured to determine the estimated position of the third lens based on the estimated throw value.

In some examples of any of the above lighting systems, the control console is further configured to communicate (e.g., 1408, FIG. 14) the estimated throw value to the control circuit via a third communication channel; wherein the first lighting fixture comprises a first motor (e.g., 530, FIG. 5) configured to translate the third lens along the optical axis of the of the first optical assembly; and wherein the first lighting fixture is configured to operate the first motor to place the third lens into the estimated position.

In some examples of any of the above lighting systems, the first lighting fixture further comprises a second motor (e.g., 510, FIG. 5) configured to translate the second lens along the optical axis of the of the first optical assembly to change the axial position.

In some examples of any of the above lighting systems, the first communication channel, the second communication channel, and the third communication channel are wireless communication channels.

According to yet another example disclosed above, e.g., in the summary section and/or in reference to any one or any combination of some or all of FIGS. 1-14, provided is a method of providing focus assistance for a rotatable lighting fixture, the method comprising: receiving (e.g., 1402, FIG. 14), with an electronic controller, a first distance measurement from a first rotatable distance-measurement device; obtaining (e.g., 1404, FIG. 14), with the electronic controller, first values representing pan and tilt angles of the first rotatable distance-measurement device and second values representing pan and tilt angles of the rotatable lighting fixture; computing (e.g., 1406, FIG. 14), with the electronic controller, an estimated throw value for the rotatable lighting fixture based on the first distance measurement, the first values, and the second values; and transmitting (e.g., 1408, FIG. 14), with the electronic controller, the estimated throw value to an electronic processor.

In some examples of the above method, the method further comprises: receiving (e.g., 1402, FIG. 14), with the electronic controller, a second distance measurement from a second rotatable distance-measurement device; and obtaining (e.g., 1404, FIG. 14), with the electronic controller, third values representing pan and tilt angles of the second rotatable distance-measurement device, wherein said computing is further based on the second distance measurement and the third values.

In some examples of any of the above methods, the method further comprises: obtaining (e.g., 804, FIG. 8), with the electronic processor, a first parameter value representing an axial position of a second lens in an optical assembly including a first lens, the second lens, and a third lens arranged along an optical axis of the optical assembly in the rotatable lighting fixture, the second lens and the third lens being independently translatable with respect to the first lens to different positions along the optical axis; and determining (e.g., modified 808, FIG. 8), with the electronic processor, a second parameter value representing an estimated position of the third lens with which an edge of an area illuminated by the rotatable lighting fixture on a projection surface is in focus, the second parameter value being determined based on the estimated throw value and further based on the first parameter value.

According to yet another example disclosed above, e.g., in the summary section and/or in reference to any one or any combination of some or all of FIGS. 1-14, provided is a non-transitory computer-readable medium storing instructions that, when executed by at least one processor, cause the at least one processor to perform operations comprising any one of the above methods of providing focus assistance.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

Unless explicitly stated otherwise, each numerical value and range should be interpreted as being approximate as if the word "about" or "approximately" preceded the value or range.

The use of figure numbers and/or figure reference labels (if any) in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third." etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Unless otherwise specified herein, in addition to its plain meaning, the conjunction "if" may also or alternatively be construed to mean "when" or "upon" or "in response to determining" or "in response to detecting." which construal may depend on the corresponding specific context. For example, the phrase "if it is determined" or "if [a stated condition] is detected" may be construed to mean "upon determining" or "in response to determining" or "upon detecting [the stated condition or event]" or "in response to detecting [the stated condition or event]."

Also, for purposes of this description, the terms "couple," "coupling." "coupled." "connect," "connecting." or "connected" refer to any manner known in the art or later developed in which energy is allowed to be transferred between two or more elements, and the interposition of one or more additional elements is contemplated, although not required. Conversely, the terms "directly coupled," "directly connected." etc., imply the absence of such additional elements. The same type of distinction applies to the use of terms "attached" and "directly attached," as applied to a description of a physical structure. For example, a relatively thin layer of adhesive or other suitable binder can be used to implement such "direct attachment" of the two corresponding components in such physical structure.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and nonvolatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As used in this application, the term "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. A lighting system, comprising:
a first lighting fixture including a first optical assembly configured to project a first light beam onto a projection surface, the first optical assembly being rotatable with respect to the projection surface and including a first lens, a second lens, and a third lens arranged along an optical axis of the first optical assembly, the second lens and the third lens being independently translatable with respect to the first lens to different positions along the optical axis of the first optical assembly;
a first distance measurement device mounted on a first pan-and-tilt apparatus and configured to provide a measure of a distance between the first distance measurement device and the projection surface, the first distance-measurement device being rotatable with respect to the projection surface by operation of the first pan-and-tilt apparatus, the first distance-measurement device and the first optical assembly being rotatable independent of one another; and
a control circuit configured to determine an estimated position of the third lens with which an edge of an area illuminated by the first light beam on the projection surface is in focus, the estimated position being determined based on the measure and further based on an axial position of the second lens in the first optical assembly.

2. The lighting system of claim 1, wherein the lighting system comprises a control console configured to:
receive the measure from the first distance measurement device via a first communication channel;
obtain respective angular orientation parameters for the first optical assembly and for the first distance measurement device; and
compute an estimated throw value for the first lighting fixture based on the measure and the respective angular orientation parameters,
wherein the control circuit is configured to determine the estimated position of the third lens based on the estimated throw value.

3. The lighting system of claim 2, wherein the control console is further configured to communicate the estimated throw value to the control circuit via a second communication channel.

4. The lighting system of claim 3,
wherein the first lighting fixture comprises a first motor configured to translate the third lens along the optical axis of the of the first optical assembly; and
wherein the first lighting fixture is configured to operate the first motor to place the third lens into the estimated position.

5. The lighting system of claim 4, wherein the first lighting fixture further comprises a second motor configured to translate the second lens along the optical axis of the of the first optical assembly to change the axial position.

6. The lighting system of claim 1, further comprising a second lighting fixture configured to project a second light beam onto the projection surface,
wherein the second lighting fixture includes the first pan-and-tilt apparatus; and
wherein the first pan-and-tilt apparatus is configured to pan and tilt the second light beam.

7. The lighting system of claim 6, wherein the second lighting fixture includes a second optical assembly configured to project the second light beam onto the projection surface, the second optical assembly being mounted on the first pan-and-tilt apparatus to rotate together with the first distance measurement device and including a fourth lens, a fifth lens, and a sixth lens arranged along an optical axis of the second optical assembly, the fifth lens and the sixth lens being independently translatable with respect to the fourth lens to different positions along the optical axis of the second optical assembly.

8. The lighting system of claim 7, wherein the control circuit is further configured to determine an estimated position of the sixth lens with which an edge of an area illuminated by the second light beam on the projection surface is in focus, the estimated position of the sixth lens being determined based on the measure and further based on an axial position of the fifth lens in the second optical assembly.

9. The lighting system of claim 1, further comprising a second lighting fixture configured to project a second light beam onto the projection surface, the second lighting fixture including a second pan-and-tilt apparatus configured to pan and tilt the second light beam.

10. The lighting system of claim 9, further comprising a second distance measurement device mounted on the second pan-and-tilt apparatus and configured to provide a measured value representing a distance between the second distance measurement device and the projection surface, the second distance-measurement device being rotatable with respect to the projection surface by operation of the second pan-and-tilt apparatus,
wherein the first optical assembly, the first distance-measurement device, and the second distance-measurement device are rotatable independent of each another.

11. The lighting system of claim 10, wherein the second lighting fixture includes a second optical assembly configured to project the second light beam onto the projection surface, the second optical assembly being mounted on the second pan-and-tilt apparatus to rotate together with the second distance measurement device and including a fourth lens, a fifth lens, and a sixth lens arranged along an optical axis of the second optical assembly, the fifth lens and the sixth lens being independently translatable with respect to the fourth lens to different positions along the optical axis of the second optical assembly.

12. The lighting system of claim 11, wherein the control circuit is further configured to determine an estimated position of the sixth lens with which an edge of an area illuminated by the second light beam on the projection surface is in focus, the estimated position of the sixth lens being determined based on the measured value and further based on an axial position of the fifth lens in the second optical assembly.

13. The lighting system of claim 10, wherein the control circuit is further configured to determine the estimated position of the third lens based on the measured value.

14. The lighting system of claim 13, wherein the lighting system comprises a control console configured to:
receive the measure from the first distance measurement device via a first communication channel;
receive the measured value from the second distance measurement device via a second communication channel;
obtain respective angular orientation parameters for the first optical assembly, for the second optical assembly, and for the first distance measurement device; and
compute an estimated throw value for the first lighting fixture based on the measure, the measured value, and the respective angular orientation parameters, wherein the control circuit is configured to determine the estimated position of the third lens based on the estimated throw value.

15. The lighting system of claim 14,
wherein the control console is further configured to communicate the estimated throw value to the control circuit via a third communication channel;
wherein the first lighting fixture comprises a first motor configured to translate the third lens along the optical axis of the of the first optical assembly; and
wherein the first lighting fixture is configured to operate the first motor to place the third lens into the estimated position.

16. The lighting system of claim 15, wherein the first lighting fixture further comprises a second motor configured to translate the second lens along the optical axis of the of the first optical assembly to change the axial position.

17. The lighting system of claim 15, wherein the first communication channel, the second communication channel, and the third communication channel are wireless communication channels.

18. A method of providing focus assistance for a rotatable lighting fixture, the method comprising:
receiving, with an electronic controller, a first distance measurement from a first rotatable distance-measurement device;
obtaining, with the electronic controller, first values representing pan and tilt angles of the first rotatable distance-measurement device and second values representing pan and tilt angles of the rotatable lighting fixture, wherein the first rotatable distance-measurement device and the rotatable lighting fixture are rotatable independent of one another;
computing, with the electronic controller, an estimated throw value for the rotatable lighting fixture based on the first distance measurement, the first values, and the second values; and
transmitting, with the electronic controller, the estimated throw value to an electronic processor.

19. The method of claim 18, further comprising:
receiving, with the electronic controller, a second distance measurement from a second rotatable distance-measurement device; and
obtaining, with the electronic controller, third values representing pan and tilt angles of the second rotatable distance-measurement device,
wherein said computing is further based on the second distance measurement and the third values.

20. The method of claim 19, further comprising:
obtaining, with the electronic processor, a first parameter value representing an axial position of a second lens in an optical assembly including a first lens, the second lens, and a third lens arranged along an optical axis of the optical assembly in the rotatable lighting fixture, the second lens and the third lens being independently translatable with respect to the first lens to different positions along the optical axis; and
determining, with the electronic processor, a second parameter value representing an estimated position of the third lens with which an edge of an area illuminated by the rotatable lighting fixture on a projection surface is in focus, the second parameter value being determined based on the estimated throw value and further based on the first parameter value.

* * * * *